United States Patent
Huang

(10) Patent No.: US 10,175,460 B2
(45) Date of Patent: Jan. 8, 2019

(54) IMAGE CAPTURING LENS SYSTEM, IMAGE CAPTURING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 24 days.

(21) Appl. No.: 15/619,687

(22) Filed: Jun. 12, 2017

(65) Prior Publication Data

US 2017/0276911 A1  Sep. 28, 2017

Related U.S. Application Data

(63) Continuation of application No. 14/967,894, filed on Dec. 14, 2015, now Pat. No. 9,709,776.

(30) Foreign Application Priority Data

Oct. 20, 2015  (TW) .............................. 104134322 A

(51) Int. Cl.
| | |
|---|---|
| G02B 13/18 | (2006.01) |
| G02B 13/00 | (2006.01) |
| G02B 9/62 | (2006.01) |
| G02B 13/02 | (2006.01) |

(52) U.S. Cl.
CPC ........... *G02B 13/0045* (2013.01); *G02B 9/62* (2013.01); *G02B 13/02* (2013.01)

(58) Field of Classification Search
CPC .............. G02B 13/001; G02B 13/0015; G02B 13/002; G02B 13/0045; G02B 9/00; G02B 9/62
See application file for complete search history.

(56) References Cited

U.S. PATENT DOCUMENTS

| | | | |
|---|---|---|---|
| 4,787,721 A | 11/1988 | Fukushima et al. |
| 5,513,042 A | 4/1996 | Itoh et al. |
| 8,335,043 B2 | 12/2012 | Huang |

(Continued)

FOREIGN PATENT DOCUMENTS

| | | |
|---|---|---|
| CN | 103597395 A | 2/2014 |
| CN | 205333956 U | 6/2016 |

(Continued)

*Primary Examiner* — Robert E Tallman
(74) *Attorney, Agent, or Firm* — Locke Lord LLP; Tim Tingkang Xia, Esq.

(57) ABSTRACT

An image capturing lens system, including, in order from an object side to an image side: a first lens element with positive refractive power having an object-side surface being convex thereof; a second lens element having negative refractive power; a third lens element; a fourth lens element; a fifth lens element with negative refractive power having at least one of an object-side surface and an image-side surface thereof being aspheric and having at least one inflection point thereof; and a sixth lens element with positive refractive power having both an object-side surface and an image-side surface being convex thereof and at least one of the object-side surface and the image-side surface thereof being aspheric; wherein the image capturing lens system has a total of six lens elements.

34 Claims, 19 Drawing Sheets

(56) References Cited

U.S. PATENT DOCUMENTS

| | | | |
|---|---|---|---|
| 8,385,006 B2 | 2/2013 | Tsai et al. | |
| 8,891,177 B2 | 11/2014 | Huang | |
| 9,316,811 B2 | 4/2016 | Chen | |
| 9,715,086 B2 * | 7/2017 | Tanaka | G02B 13/0045 |
| 2013/0010181 A1 | 1/2013 | Baba | |
| 2014/0211325 A1 | 7/2014 | Lai | |
| 2015/0338613 A1 | 11/2015 | Tang et al. | |
| 2015/0338614 A1 | 11/2015 | Tang et al. | |
| 2015/0362702 A1 | 12/2015 | Tang et al. | |
| 2016/0041370 A1 | 2/2016 | Lee et al. | |
| 2016/0109688 A1 | 4/2016 | Jo | |
| 2016/0124184 A1 | 5/2016 | Tang et al. | |
| 2016/0124186 A1 | 5/2016 | Tang et al. | |
| 2016/0124192 A1 | 5/2016 | Koreeda | |
| 2016/0131870 A1 | 5/2016 | Tang et al. | |
| 2016/0131871 A1 | 5/2016 | Tang et al. | |
| 2016/0131872 A1 | 5/2016 | Tang et al. | |
| 2016/0131873 A1 | 5/2016 | Tang et al. | |
| 2016/0170182 A1 * | 6/2016 | Tanaka | G02B 13/0045 359/713 |
| 2016/0341934 A1 | 11/2016 | Mercado | |
| 2017/0052346 A1 | 2/2017 | Tang et al. | |
| 2017/0052347 A1 | 2/2017 | Tang et al. | |

FOREIGN PATENT DOCUMENTS

| | | |
|---|---|---|
| JP | S58-033211 | 2/1983 |
| JP | S58-046312 | 3/1983 |
| JP | S1984-083121 | 5/1984 |
| JP | S62-183419 | 8/1987 |
| JP | 2005-148430 | 6/2005 |
| JP | 2011-203313 | 10/2011 |
| JP | 2013-182090 | 9/2013 |
| JP | 2014-010399 | 1/2014 |
| JP | 2016-09077 | 5/2016 |
| JP | 2016-114803 | 6/2016 |
| JP | 2016-136239 | 7/2016 |
| JP | 2016-218242 | 12/2016 |
| JP | 2017-003703 | 1/2017 |
| WO | 2011118434 A1 | 9/2011 |
| WO | 2012169778 A2 | 12/2012 |

* cited by examiner

IMAGE CAPTURING LENS SYSTEM, IMAGE CAPTURING APPARATUS AND ELECTRONIC DEVICE

RELATED APPLICATIONS

This application is a continuation application of U.S. application Ser. No. 14/967,894 filed on Dec. 14, 2015, now approved and claims priority to Taiwan Application Serial Number 104134322, filed on Oct. 20, 2015, which is incorporated by reference herein in its entirety.

BACKGROUND

Technical Field

The present disclosure relates to an image capturing lens system and an image capturing apparatus, and more particularly, to an image capturing lens system and an image capturing apparatus applicable to electronic devices.

Description of Related Art

With the wide adoptions of the image capturing modules, utilizing image capturing modules in various applications such as smart consumer electronics, car devices and smart household electronics has become a trend to the future development of technology. Also, in order to obtain more extensive user experiences, smart devices with multi-lens systems have become the main stream in the market and thus various types of lens systems with different characteristics are developed to meet the requirements of various applications.

Currently, most compact lens systems adopted in the consumer electronics focus on the imaging quality of macro and wide angle photography. However, the optical designs of those lens systems couldn't satisfy the need for telephoto photography. Most conventional optical systems for telephoto adopt multi-lens structures with spherical glass lenses which results in an overly large lens system and a unit price being too high to be applied in various products or devices. Therefore, the conventional optical systems fail to meet the need of the current technology trend.

SUMMARY

According to one aspect of the present disclosure, an image capturing lens system comprising, in order from an object side to an image side: a first lens element with positive refractive power having an object-side surface being convex thereof; a second lens element having negative refractive power; a third lens element; a fourth lens element; a fifth lens element with negative refractive power having at least one of an object-side surface and an image-side surface thereof being aspheric and having at least one inflection point thereof; and a sixth lens element with positive refractive power having both an object-side surface and an image-side surface being convex thereof and at least one of the object-side surface and the image-side surface thereof being aspheric; wherein the image capturing lens system has a total of six lens elements; wherein an axial distance between the image-side surface of the sixth lens element and an image surface is BL, an axial distance between the object-side surface of the first lens element and the image-side surface of the sixth lens element is TD, a focal length of the image capturing lens system is f, a curvature radius of the object-side surface of the first lens element is R1, an axial distance between the fifth lens element and the sixth lens element is T56, a central thickness of the first lens element is CT1, and the following conditions are satisfied:

$0<BL/TD<0.40$;

$3.10<f/R1<7.50$; and $T56<CT1$.

According to another aspect of the present disclosure, an image capturing lens system, comprising, in order from an object side to an image side: a first lens element with positive refractive power having an object-side surface being convex thereof; a second lens element having negative refractive power; a third lens element; a fourth lens element; a fifth lens element with negative refractive power having an image-side surface being concave, at least one of an object-side surface and the image-side surface thereof being aspheric, and at least one inflection point thereof; and a sixth lens element with positive refractive power having an image-side surface being convex thereof and at least one of an object-side surface and the image-side surface thereof being aspheric; wherein the image capturing lens system has a total of six lens elements; wherein an axial distance between the image-side surface of the sixth lens element and an image surface is BL, an axial distance between the object-side surface of the first lens element and the image-side surface of the sixth lens element is TD, a focal length of the image capturing lens system is f, a curvature radius of the object-side surface of the first lens element is R1, a curvature radius of the image-side surface of the fifth lens element is R10, an axial distance between the fifth lens element and the sixth lens element is T56, an axial distance between the fourth lens element and the fifth lens element is T45, and the following conditions are satisfied:

$0<BL/TD<0.40$;

$3.10<f/R1<7.50$;

$0.50<f/R10$; and $T56<T45$.

According to yet another aspect of the present disclosure, an image capturing apparatus is provided, which includes the aforementioned image capturing lens system and an image sensor.

According to the other aspect of the present disclosure, an electronic device is provided, which includes the aforementioned image capturing apparatus.

DETAILED DESCRIPTION

Figure 1A:
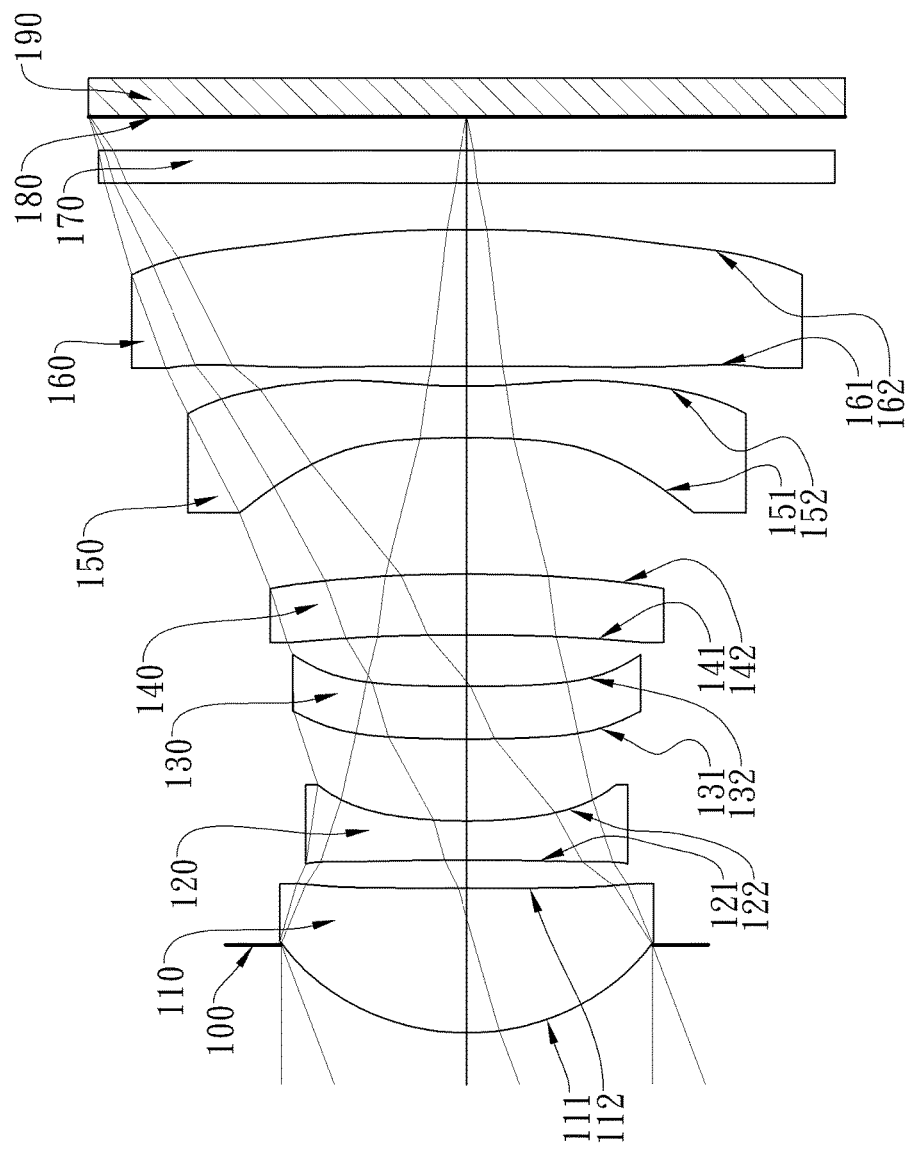
FIG. 1A is a schematic view of an image capturing apparatus according to the 1st embodiment of the present disclosure.

The present disclosure provides an image capturing lens system including, in order from an object side to an image side, a first lens element, a second lens element, a third lens element, a fourth lens element, a fifth lens element, and a sixth lens element.

The first lens element has positive refractive power so as to provide major focusing power for the image capturing lens system and thus the size of the image capturing lens system can be effectively controlled and the portability can be increased. The first lens element has an object-side surface being convex in a paraxial region, which is favorable for enhancing the positive refractive power and further miniaturizing the lens system. The first lens element may have an image-side surface being concave, which can correct aberrations of the lens system.

The second lens element has negative refractive power so as to correct chromatic aberration of the lens system. The second lens element may have an object-side surface being concave for balancing the positive refractive power of the first lens element.

The third lens element may have at least one inflection point so as to correct aberrations in an off-axial region.

The fourth lens element may have positive or negative refractive power in accordance with the configuration of the lens system to correct aberrations and reduce the sensitivity of the lens system.

The fifth lens element has negative refractive power, at least one of an object-side surface and an image-side surface being aspheric so as to form a symmetrical structure with the second lens element to improve the symmetry of the lens system. The fifth lens element further has at least one inflection point to correct aberrations in an off-axial region to improve the image quality. The image-side surface of the fifth lens element may be concave to further strengthen the aberration correcting ability of the lens system.

The sixth lens element has positive refractive power so as to form a symmetrical structure with the first lens element to improve the symmetry of the lens system. Both an object-side surface and an image-side surface of the sixth lens element are convex and there is at least one surface being aspheric so as to correct aberrations in the off-axial region and therefore improve the image quality.

The image capturing lens system has a total of six lens elements. When an axial distance between the image-side surface of the sixth lens element and an image surface is BL, an axial distance between the object-side surface of the first lens element and the image-side surface of the sixth lens element is TD, and the following condition is satisfied: 0<BL/TD<0.40, the back focus of the lens system can be effectively controlled and avoid an excessive total track length.

When a focal length of the image capturing lens system is f, a curvature radius of the object-side surface of the first lens element is R1, and the following condition is satisfied: 3.10<f/R1<7.50, the lens system obtains the functionality of telephoto and also effectively limits the total track length of the lens system.

When an axial distance between the fifth lens element and the sixth lens element is T56, a central thickness of the first lens element is CT1, and the following condition is satisfied: T56<CT1, the symmetrical structure of the first lens element and the sixth lens element is enhanced so as to improve the symmetry of the lens system for higher image quality When the focal length of the image capturing lens system is f, a curvature radius of the image-side surface of the fifth lens element is R10, and the following condition is satisfied: 0.50<f/R10, the back focal length of the lens system can be compressed and the volume of the lens system can be controlled to avoid a waste of space. Preferably, the following condition is satisfied: 1.0<f/R10.

When an axial distance between the fifth lens element and the sixth lens element is T56, an axial distance between the fourth lens element and the fifth lens element is T45, and the following condition is satisfied: T56<T45, a more appropriate arrangement of the fifth lens system is provided to correct aberrations of the lens system. Preferably, the following condition is satisfied: T56/T45<0.6. T45 may be the largest among all axial distances between any two adjacent lens elements of the first lens element, the second lens element, the third lens element, the fourth lens element, the fifth lens element, and the sixth lens element in the image capturing lens system to provide excellent telephoto performance.

The image capturing lens system can further comprise an aperture stop disposed between an imaged object and the third lens element and the properties between telecentric effect and wide angle of view of the lens system are balanced thereby.

Each of the first lens element, the second lens element, the third lens element, the fourth lens element, the fifth lens element, and the sixth lens element may be a single and non-cemented lens element to avoid adverse influences from the cementing process.

When an Abbe number of the sixth lens element is V6 and the following condition is satisfied: V6<30, chromatic aberration of the lens system can be balanced and thus better image quality can be obtained.

When a curvature radius of the object-side surface of the sixth lens element is R11, a curvature radius of the image-side surface of the sixth lens element is R12, and the following condition is satisfied: −1.0<(R11+R12)/(R11−R12)<1.0, spherical aberration can be reduced in order to maintain better image quality.

When a curvature radius of the object-side surface of the third lens element is R5, a curvature radius of the image-side surface of the third lens element is R6, and the following condition is satisfied: −1.0<(R5−R6)/(R5+R6)<1.0, aberrations of the lens system are reduced thereby.

When an entrance pupil diameter of the image capturing lens system is EPD, a maximum image height of the image capturing lens system is ImgH, and the following condition is satisfied: 0.70<EPD/ImgH<1.50, the ratio of the incident light range and the image forming area can be balanced in order to provide sufficient light for the lens system and improve the image brightness.

When an axial distance between the object-side surface of the first lens element and the image surface is TL, the focal length of the image capturing lens system is f, and the following condition is satisfied: 0.85<TL/f<1.10, the angle of the view is effectively controlled for better telephoto imaging.

When a vertical distance between a critical point on the image-side surface of the fifth lens element and an optical axis is Yc52, the focal length of the image capturing lens system is f, and the following condition is satisfied: 0.05<Yc52/f<0.50, Petzval's sum can be corrected and the image quality of the field in an off-axial region is improved.

When the focal length of the image capturing lens system is f and the following condition is satisfied: 4.0 mm<f<12.0 mm, the image capturing lens system can be more compact thereby.

When the focal length of the image capturing lens system is f, the maximum image height of the image capturing lens system is ImgH, and the following condition is satisfied: 2.35<f/ImgH, the imaged region is controlled and the resolution of the image is improved.

When the focal length of the image capturing lens system is f, a focal length of the third lens element is f3, a focal length of the fourth lens element is f4, a focal length of the second lens element is f2, and the following condition is satisfied: (|f/f3|+|f/f4|)/|f/f2|<1.0, the refractive power of the third lens element and the fourth lens element are more appropriate and aberrations of the lens system can be corrected thereby.

The first lens element, the second lens element, the third lens element, the fourth lens element, the fifth lens element and the sixth lens element can be made of plastic material so as to reduce the production cost and increase the productivity of the lens elements.

When a maximum refractive index among the first lens element, the second lens element, the third lens element, the fourth lens element, the fifth lens element and the sixth lens element is Nmax, and the following condition is satisfied: Nmax<1.70, a better arrangement of the materials of the lens elements can be obtained and the distribution of the refractive power of each the lens element is balanced thereby.

All the object-side surfaces and image-side surfaces of the first lens element, the second lens element, the third lens element, the fourth lens element, the fifth lens element and the sixth lens element may be aspheric to enlarge the degree of freedom in design and improve the aberration correcting ability of the lens system.

When a half of the maximal field of view of the image capturing lens system is HFOV, and the following condition is satisfied: 0<tan(2*HFOV)<1.0, the imaged region can be effectively controlled and a good telephoto imaging ability is provided thereby and hence the need of better telephoto imaging can be fulfilled.

When an Abbe number of the first lens element is V1, an Abbe number of the second lens element is V2, an Abbe number of the third lens element is V3, and the following condition is satisfied: (V2+V3)/V1<1.0, the chromatic aberration of the lens system can be corrected and hence the image quality can be improved thereby.

When a focal length of the first lens element is f1, the focal length of the second lens element is f2, the focal length of the third lens element is f3, the focal length of the fourth lens element is f4, a focal length of the fifth lens element is f5, a focal length of the sixth lens element is f6, and |f1|, |f2| and |f5| are smaller than |f3|, |f4| and |f6|, the refractive power distribution of the entire lens system is more suitable for telephoto imaging with better imaging results.

When an axial distance between the aperture stop and the image-side surface of the sixth lens element is SD, the axial distance between the object-side surface of the first lens element and the image-side surface of the sixth lens element is TD, and the following conditions are satisfied, 0.70<SD/TD<1.0, the properties between telecentric effect and wide angle of view of the lens system are balanced thereby.

When an axial distance between the first lens element and the second lens element is T12, the axial distance between the fifth lens element and the sixth lens element is T56, an axial distance between the second lens element and the third lens element is T23, an axial distance between the third lens element and the fourth lens element is T34, the axial distance between the fourth lens element and the fifth lens element is T45, and the following conditions are satisfied: (T12+T56)/(T23+T34+T45)<0.30, the arrangement of the first lens element and the sixth lens element in the lens system is more appropriate and a better symmetry of the lens system is provided thereby.

When the curvature radius of the object-side surface of the first lens element is R1, a curvature radius of the image-side surface of the sixth lens element is R12, and the following condition is satisfied: −1.0<(R1+R12)/(R1−R12)<0, the curvature radius of the object-side surface of the first lens element and the image-side surface of the sixth lens element are more appropriate and the symmetry of the lens system is further improved thereby.

When an axial distance between the object-side surface of the first lens element and the image surface is TL, a vertical distance between a maximum effective diameter position on the image-side surface of the sixth lens element and an optical axis is Y62, a vertical distance between a maximum effective diameter position on the object-side surface of the first lens element and the optical axis is Y11, and the following condition is satisfied: 5.5<TL/(Y62−Y11)<12.0, a localized image resolution of telephoto is enhanced for usage in more aspects of applications.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Further-more, surfaces of each lens element can be arranged to be aspheric (ASP). Since these aspheric surfaces can be easily formed into shapes other than spherical shapes so as to have more controllable variables for eliminating aberrations and to further decrease the required number of lens elements, the total track length of the image capturing lens system can be effectively reduced.

According to the image capturing lens system of the present disclosure, the image capturing lens system can include at least one stop, such as an aperture stop, a glare stop or a field stop, so as to favorably reduce the amount of stray light and thereby to improve the image quality.

According to the image capturing lens system of the present disclosure, an aperture stop can be configured as a front stop or a middle stop. A front stop disposed between an imaged object and the first lens element can provide a longer distance between an exit pupil of the image capturing lens system and the image surface, so that the generated telecentric effect can improve the image-sensing efficiency of an image sensor, such as a CCD or CMOS sensor. A middle stop disposed between the first lens element and the image surface is favorable for enlarging the field of view of the image capturing lens system, thereby providing the image capturing lens system the advantages of a wide-angle lens.

According to the image capturing lens system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the image capturing lens system of the present disclosure, the image surface of the image capturing lens system, based on the corresponding image sensor, can be a plane or a curved surface with any curvature, especially a curved surface being concave facing towards the object side.

The image capturing lens system of the present disclosure can be optionally applied to moving focus optical systems. According to the image capturing lens system of the present disclosure, the image capturing lens system features a good correction capability and high image quality, and can be applied to 3D (three-dimensional) image capturing applications and electronic devices, such as digital cameras, mobile devices, digital tablets, smart TV, network surveillance devices, motion sensing input devices, driving recording systems, rear view camera systems, and wearable devices.

According to the present disclosure, an image capturing apparatus is provided, which includes the aforementioned image capturing lens system and the image sensor, wherein the image sensor is disposed on or near an image surface of the image capturing lens system. Therefore, the design of the image capturing lens system enables the image capturing apparatus to achieve the best image quality. Preferably, the image capturing lens system can further include a barrel member, a holder member or a combination thereof.

Figure 9A:
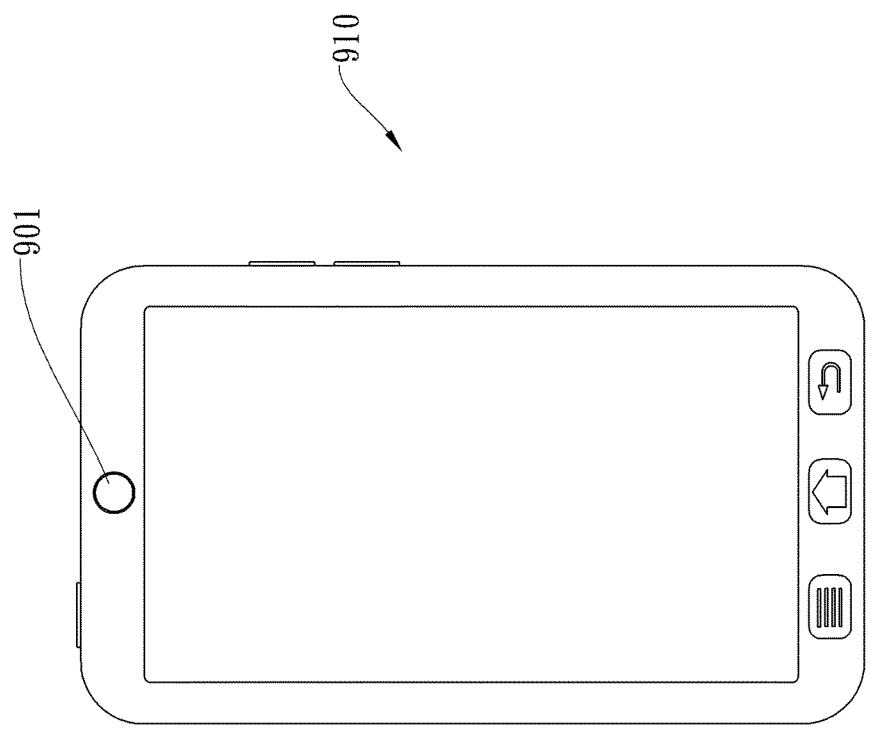
FIG. 9A shows an electronic device with an image capturing apparatus of the present disclosure installed therein.
Figure 9B:
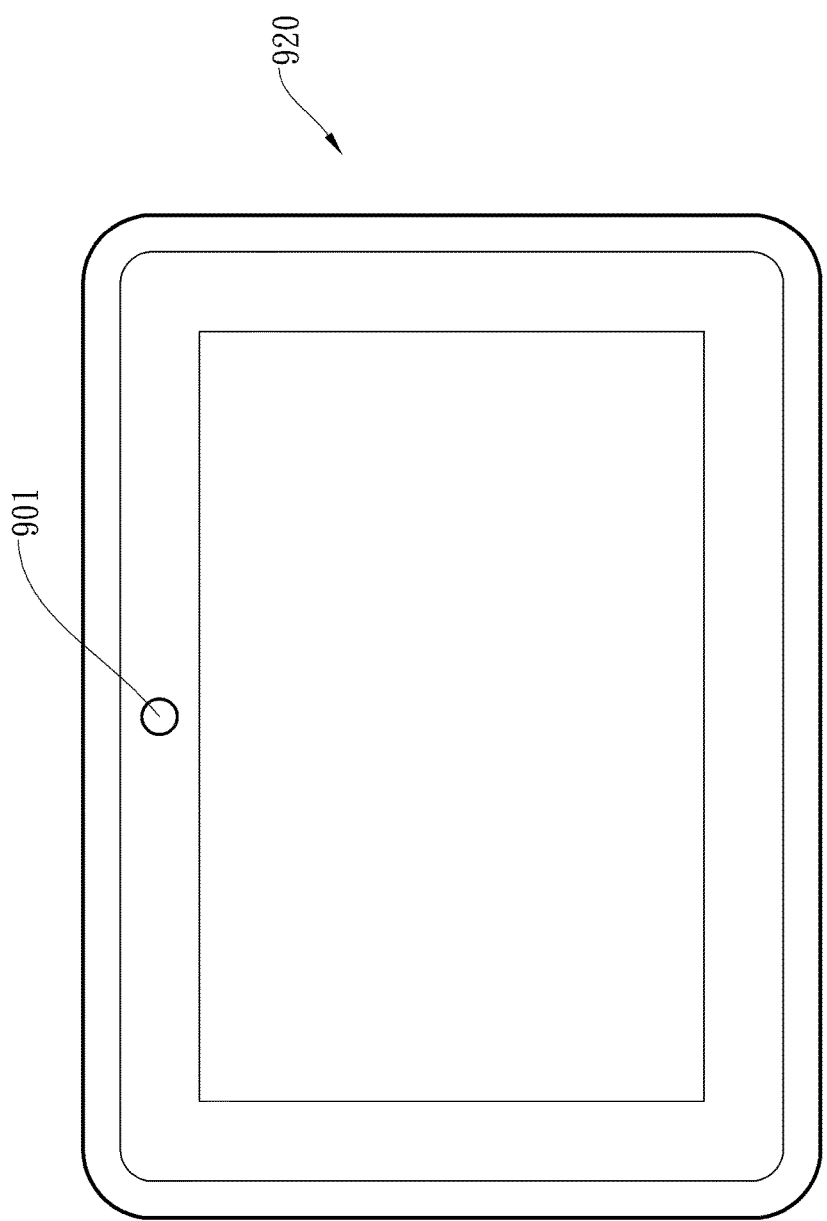
FIG. 9B shows another electronic device with an image capturing apparatus of the present disclosure installed therein.
Figure 9C:
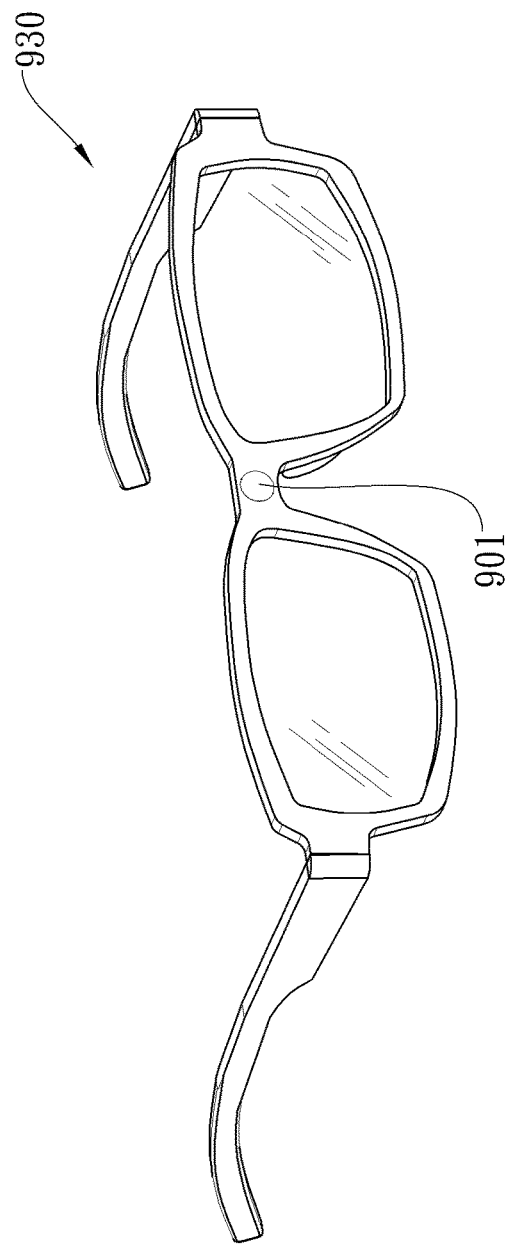
FIG. 9C shows yet another electronic device with an image capturing apparatus of the present disclosure installed therein.

Referring to FIG. 9A, FIG. 9B and FIG. 9C, an image capturing apparatus 901 may be installed in an electronic device including, but not limited to, a smartphone 910, a tablet personal computer 920 or a wearable device 930. The three exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-8th specific embodiments are provided for further explanations.

1st Embodiment

Figure 1B:
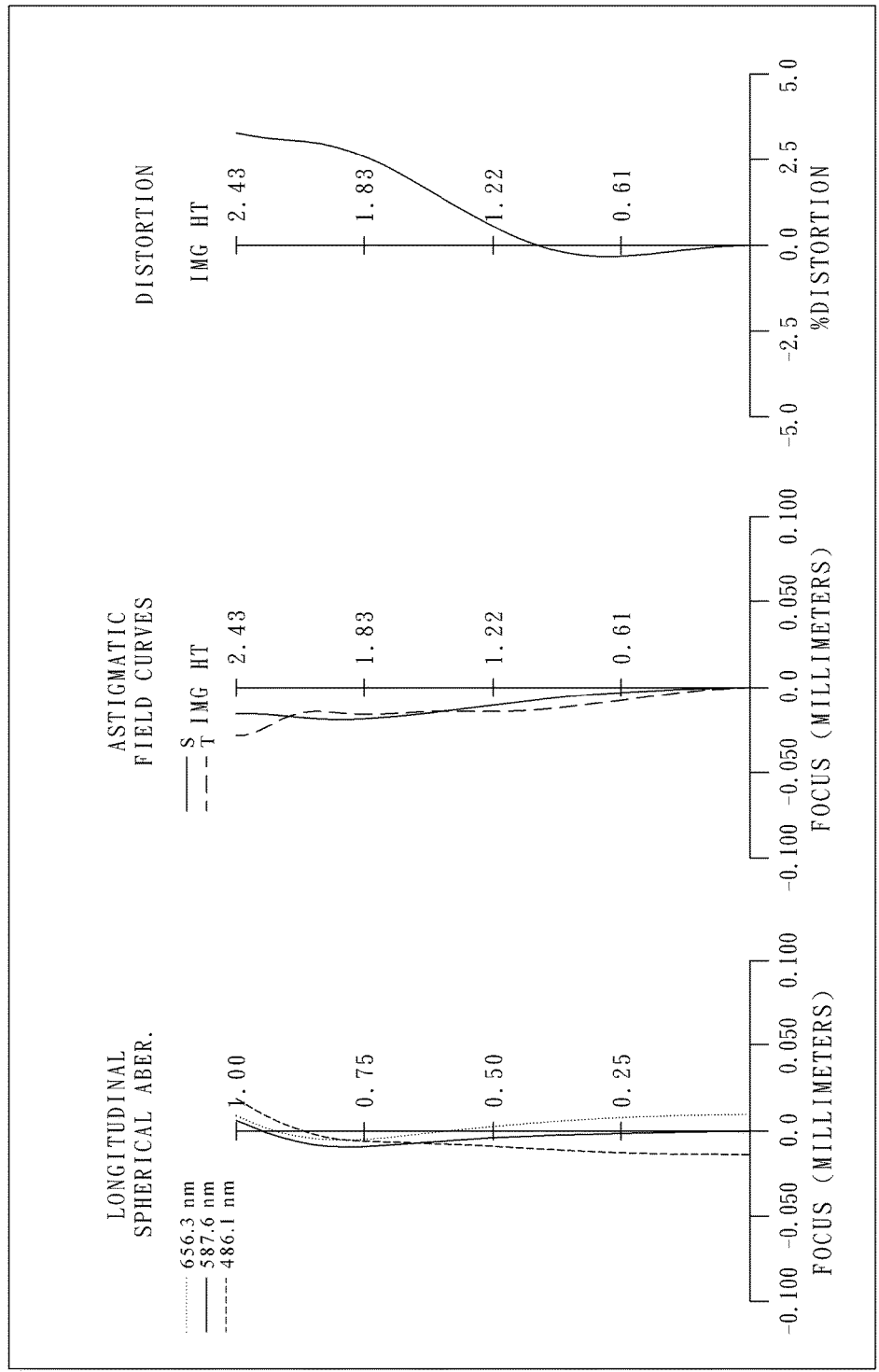
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an image capturing lens system (not otherwise herein labeled) of the present disclosure and an image sensor 190. The image capturing lens system includes, in order from an object side to an image side, an aperture stop 100, a first lens element 110, a second lens element 120, a third lens element 130, a fourth lens element 140, a fifth lens element 150, and a sixth lens element 160.

The first lens element 110 with positive refractive power has an object-side surface 111 being convex in a paraxial region thereof and an image-side surface 112 being concave in a paraxial region thereof, which are both aspheric, and the first lens element 110 is made of plastic material.

The second lens element 120 with negative refractive power has an object-side surface 121 being concave in a paraxial region thereof and an image-side surface 122 being concave in a paraxial region thereof, which are both aspheric, and the second lens element 120 is made of plastic material.

The third lens element 130 with positive refractive power has an object-side surface 131 being convex in a paraxial region thereof and an image-side surface 132 being concave in a paraxial region thereof, which are both aspheric and have inflection points. The third lens element 130 is made of plastic material.

The fourth lens element 140 with positive refractive power has an object-side surface 141 being concave in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being concave in a paraxial region thereof and an image-side surface 152 being concave in a paraxial region thereof, which are both aspheric and have inflection points. The fifth lens element 150 is made of plastic material.

The sixth lens element 160 with positive refractive power has an object-side surface 161 being convex in a paraxial region thereof and an image-side surface 162 being convex in a paraxial region thereof, which are both aspheric, and the sixth lens element 160 is made of plastic material.

The image capturing lens system further includes an IR cut filter 170 located between the sixth lens element 160 and an image surface 180. The IR cut filter 170 is made of glass material and will not affect the focal length of the image capturing lens system. The image sensor 190 is disposed on or near the image surface 180 of the image capturing lens system.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
f = 6.20 mm, Fno = 2.60, HFOV = 20.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.556 | | | | |
| 2 | Lens 1 | 1.564 | ASP | 0.930 | Plastic | 1.544 | 56.0 | 2.99 |
| 3 | | 31.758 | ASP | 0.186 | | | | |
| 4 | Lens 2 | −44.351 | ASP | 0.250 | Plastic | 1.639 | 23.5 | −4.67 |
| 5 | | 3.205 | ASP | 0.527 | | | | |
| 6 | Lens 3 | 9.663 | ASP | 0.338 | Plastic | 1.544 | 56.0 | 1607.98 |
| 7 | | 9.650 | ASP | 0.331 | | | | |
| 8 | Lens 4 | −18.268 | ASP | 0.396 | Plastic | 1.639 | 23.5 | 42.17 |
| 9 | | −10.977 | ASP | 0.876 | | | | |
| 10 | Lens 5 | −10.622 | ASP | 0.331 | Plastic | 1.544 | 56.0 | −4.63 |
| 11 | | 3.341 | ASP | 0.127 | | | | |
| 12 | Lens 6 | 22.127 | ASP | 0.884 | Plastic | 1.639 | 23.5 | 16.79 |
| 13 | | −20.470 | ASP | 0.300 | | | | |
| 14 | IR Cut Filter | Plano | | 0.210 | Glass | 1.517 | 64.2 | |
| 15 | | Plano | | 0.216 | | | | |
| 16 | Image Surface | Plano | | | | | | |

Note:
Reference wavelength is d-line 587.6 nm

TABLE 2

Aspheric Coefficients

| Surface # | 2 | 3 | 4 | 5 |
|---|---|---|---|---|
| k = | −1.0422E−01 | 6.3260E+01 | −7.3778E+01 | −1.1468E+00 |
| A4 = | 5.9279E−03 | −2.7661E−02 | −1.0725E−01 | −4.4849E−02 |
| A6 = | −3.8975E−03 | −9.6731E−03 | 1.9351E−01 | 2.7318E−01 |
| A8 = | 1.4508E−02 | 2.0694E−01 | 1.2238E−01 | −7.4407E−01 |
| A10 = | −1.1007E−02 | −3.3157E−01 | −5.4985E−01 | −1.2947E−01 |
| A12 = | 5.2654E−03 | 2.3573E−01 | 4.9928E−01 | 9.0637E−02 |
| A14 = | | −6.7427E−02 | −1.6523E−01 | |

| Surface # | 6 | 7 | 8 | 9 |
|---|---|---|---|---|
| k = | 3.3839E+01 | 6.3338E+01 | 3.9095E+01 | 3.4521E+01 |
| A4 = | −7.8106E−03 | 3.8423E−03 | −1.2216E−02 | −2.6235E−03 |
| A6 = | 6.4730E−02 | 6.0197E−02 | 4.2458E−03 | −1.0102E−03 |
| A8 = | 1.2900E−01 | 6.8136E−02 | 9.3324E−05 | 5.0678E−04 |
| A10 = | −2.3188E−01 | −1.1957E−01 | 1.3554E−04 | −2.2581E−06 |
| A12 = | 1.5174E−01 | 8.6201E−02 | | |
| A14 = | −4.1142E−02 | −3.0009E−02 | | |

| Surface # | 10 | 11 | 12 | 13 |
|---|---|---|---|---|
| k = | 3.7259E+01 | 1.1170E−01 | −9.0000E+01 | 7.3132E+01 |
| A4 = | −1.3650E−01 | −1.7920E−01 | −8.3888E−02 | −8.3507E−02 |
| A6 = | −3.1139E−02 | 4.1315E−02 | 9.4433E−02 | 7.6778E−02 |
| A8 = | 8.0188E−02 | 3.1426E−02 | −4.8400E−02 | −3.3033E−02 |
| A10 = | −3.5736E−02 | −2.7518E−02 | 1.3883E−02 | 8.0335E−03 |
| A12 = | 3.1094E−03 | 8.8466E−03 | −2.3698E−03 | −1.1644E−03 |
| A14 = | 1.6580E−03 | −1.3770E−03 | 2.2308E−04 | 9.3121E−05 |
| A16 = | −3.1116E−04 | 8.6696E−05 | −8.8134E−06 | −3.0641E−06 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the image capturing lens system is f, an f-number of the image capturing lens system is Fno, a half of a maximal field of view of the image capturing lens system is HFOV, and these parameters have the following values: f=6.20 mm; Fno=2.60; and HFOV=20.8 degrees.

In the 1st embodiment, an Abbe number of the sixth lens element is V6, and it satisfies the condition: V6=23.5.

In the 1st embodiment, an Abbe number of the second lens element is V2, an Abbe number of the third lens element is V3, an Abbe number of the first lens element is V1, and they satisfy the condition: (V2+V3)/V1=1.42.

In the 1st embodiment, a maximum refractive index among the first lens element, the second lens element, the third lens element, the fourth lens element, the fifth lens element and the sixth lens element is Nmax, and it satisfies: Nmax=1.639.

In the 1st embodiment, an axial distance between the fifth lens element and the sixth lens element is T56, an axial distance between the fourth lens element and the fifth lens element is T45, and they satisfy the condition: T56/T45=0.14.

In the 1st embodiment, an axial distance between the first lens element and the second lens element is T12, the axial distance between the fifth lens element and the sixth lens element is T56, an axial distance between the second lens element and the third lens element is T23, an axial distance between the third lens element and the fourth lens element is T34, the axial distance between the fourth lens element and the fifth lens element is T45, and they satisfy the condition: (T12+T56)/(T23+T34+T45)=0.18.

In the 1st embodiment, the focal length of the image capturing lens system is f, a curvature radius of the object-side surface of the first lens element is R1, and they satisfy the condition: f/R1=3.96.

In the 1st embodiment, the focal length of the image capturing lens system is f, a curvature radius of the image-side surface of the fifth lens element is R10, and they satisfy the condition: f/R10=1.86.

In the 1st embodiment, the curvature radius of the object-side surface of the first lens element is R1, a curvature radius of the image-side surface of the sixth lens element is R12, and they satisfy the condition: (R1+R12)/(R1−R12)=−0.86.

In the 1st embodiment, a curvature radius of the object-side surface of the third lens element is R5, a curvature radius of the image-side surface of the third lens element is R6, and they satisfy the condition: (R5−R6)/(R5+R6)=0.0006.

In the 1st embodiment, a curvature radius of the object-side surface of the sixth lens element is R11, the curvature radius of the image-side surface of the sixth lens element is R12, and they satisfy the condition: (R11+R12)/(R11−R12)=0.04.

In the 1st embodiment, the focal length of the image capturing lens system is f, a focal length of the third lens element is f3, a focal length of the fourth lens element is f4, a focal length of the second lens element is f2, and they satisfy the condition: (|f/f3|+|f/f4|)/|f/f2|=0.11.

In the 1st embodiment, a vertical distance between a critical point on the image-side surface of the fifth lens element and an optical axis is Yc52, the focal length of the image capturing lens system is f, and they satisfy the condition: Yc52/f=0.12.

In the 1st embodiment, an axial distance between the object-side surface of the first lens element and the image surface is TL, the focal length of the image capturing lens system is f, and they satisfy the condition: TL/f=0.95.

In the 1st embodiment, an axial distance between the aperture stop and the image-side surface of the sixth lens element is SD, an axial distance between the object-side surface of the first lens element and the image-side surface of the sixth lens element is TD, and they satisfy the condition: SD/TD=0.89.

In the 1st embodiment, an axial distance between the image-side surface of the sixth lens element and the image surface is BL, the axial distance between the object-side surface of the first lens element and the image-side surface of the sixth lens element is TD, and they satisfy the condition: BL/TD=0.14.

In the 1st embodiment, the focal length of the image capturing lens system is f, a maximum image height of the image capturing lens system is ImgH, and they satisfy f/ImgH=2.55.

In the 1st embodiment, an entrance pupil diameter of the image capturing lens system is EPD, the maximum image height of the image capturing lens system is ImgH, and they satisfy EPD/ImgH=0.98.

In the 1st embodiment, the half of the maximal field of view of the image capturing lens system is HFOV, and it satisfies the condition: tan(2*HFOV)=0.89.

In the 1st embodiment, an axial distance between the object-side surface of the first lens element and the image surface is TL, a vertical distance between a maximum effective diameter position on the image-side surface of the sixth lens element and the optical axis is Y62, a vertical distance between a maximum effective diameter position on the object-side surface of the first lens element and the optical axis is Y11, and they satisfy the condition: TL/(Y62−Y11)=6.17.

2nd Embodiment

Figure 2A:
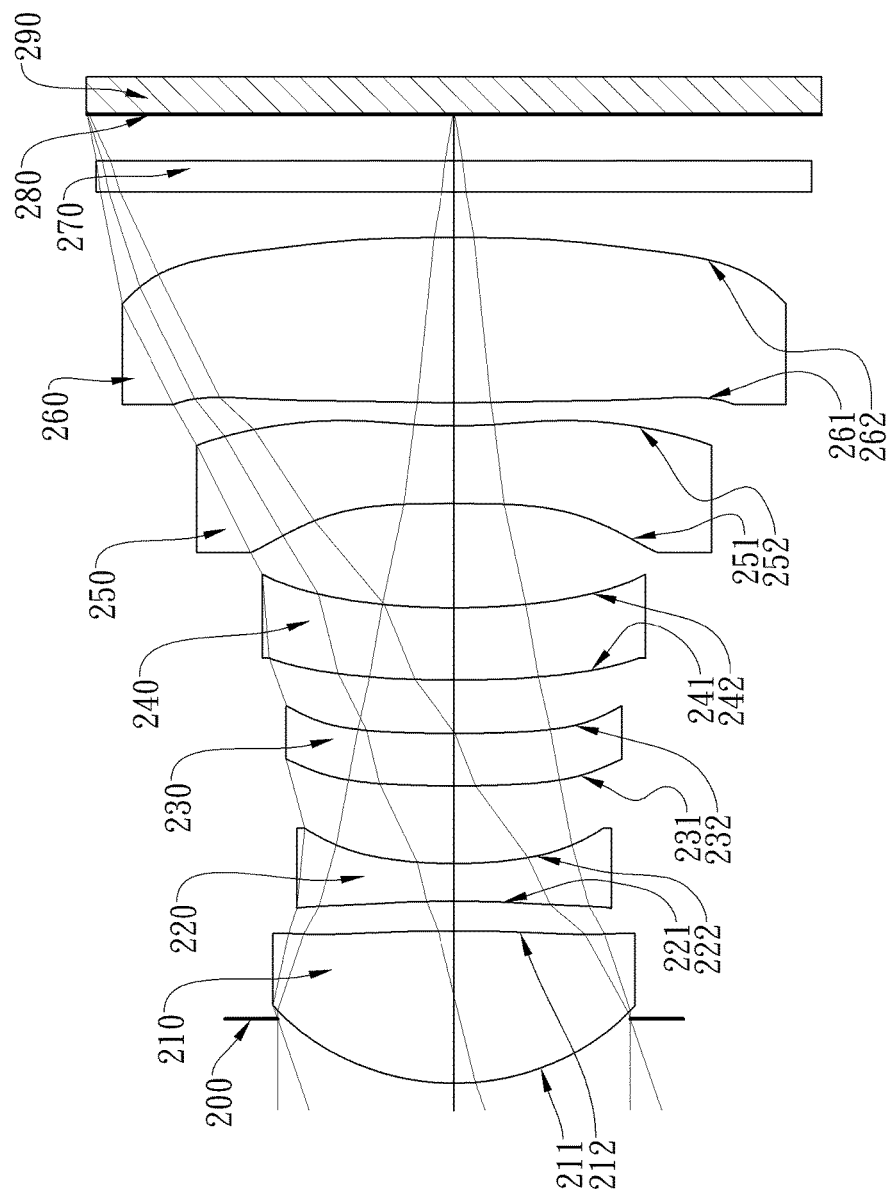
FIG. 2A is a schematic view of an image capturing apparatus according to the 2nd embodiment of the present disclosure.
Figure 2B:
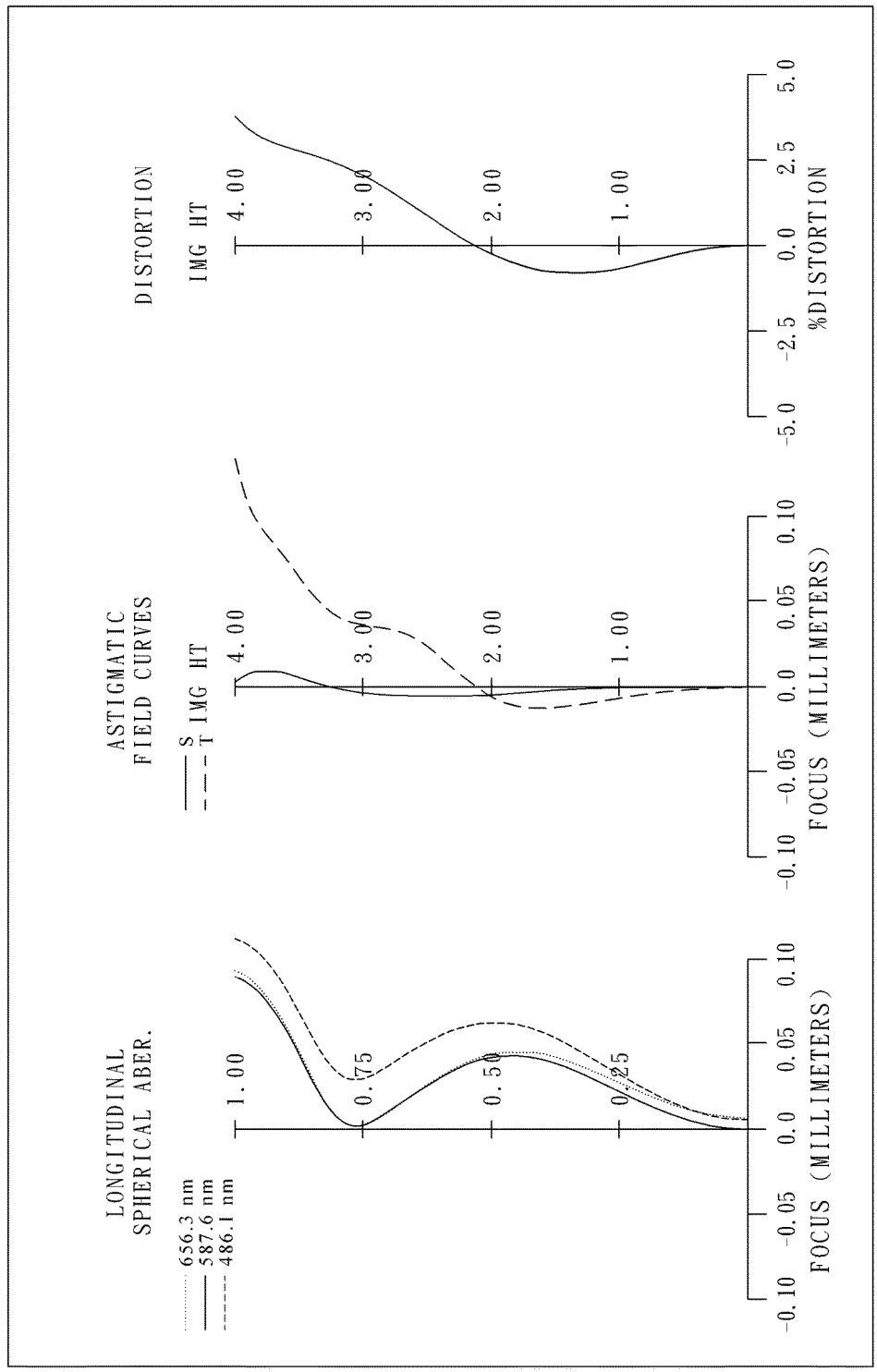
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an image capturing lens system (not otherwise herein labeled) of the present disclosure and an image sensor 290. The image capturing lens system includes, in order from an object side to an image side, an aperture stop 200, a first lens element 210, a second lens element 220, a third lens element 230, a fourth lens element 240, a fifth lens element 250, and a sixth lens element 260.

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being concave in a paraxial region thereof and an image-side surface 222 being concave in a paraxial region thereof, which are both aspheric, and the second lens element 220 is made of plastic material.

The third lens element 230 with positive refractive power has an object-side surface 231 being convex in a paraxial region thereof and an image-side surface 232 being concave in a paraxial region thereof, which are both aspheric and have inflection points. The third lens element 230 is made of plastic material.

The fourth lens element 240 with negative refractive power has an object-side surface 241 being convex in a paraxial region thereof and an image-side surface 242 being concave in a paraxial region thereof, which are both aspheric, and the fourth lens element 240 is made of plastic material.

The fifth lens element 250 with negative refractive power has an object-side surface 251 being concave in a paraxial region thereof and an image-side surface 252 being concave in a paraxial region thereof, which are both aspheric and have inflection points. The fifth lens element 250 is made of plastic material.

The sixth lens element 260 with positive refractive power has an object-side surface 261 being convex in a paraxial region thereof and an image-side surface 262 being convex in a paraxial region thereof, which are both aspheric, and the sixth lens element 260 is made of plastic material.

The image capturing lens system further includes an IR cut filter 270 located between the sixth lens element 260 and an image surface 280. The IR cut filter 270 is made of glass material and will not affect the focal length of the image capturing lens system. The image sensor 290 is disposed on or near the image surface 280 of the image capturing lens system.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 11.18 mm, Fno = 2.91, HFOV = 18.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.700 | | | | |
| 2 | Lens 1 | 2.772 | ASP | 1.657 | Plastic | 1.544 | 55.9 | 4.65 |
| 3 | | −23.142 | ASP | 0.330 | | | | |
| 4 | Lens 2 | −19.621 | ASP | 0.411 | Plastic | 1.639 | 23.5 | −6.18 |
| 5 | | 4.989 | ASP | 0.846 | | | | |
| 6 | Lens 3 | 13.439 | ASP | 0.571 | Plastic | 1.639 | 23.5 | 116.00 |
| 7 | | 16.143 | ASP | 0.581 | | | | |
| 8 | Lens 4 | 12.429 | ASP | 0.796 | Plastic | 1.544 | 55.9 | −52.36 |
| 9 | | 8.459 | ASP | 1.133 | | | | |
| 10 | Lens 5 | −34.265 | ASP | 0.847 | Plastic | 1.544 | 55.9 | −8.82 |
| 11 | | 5.627 | ASP | 0.252 | | | | |
| 12 | Lens 6 | 16.343 | ASP | 1.806 | Plastic | 1.639 | 23.5 | 21.67 |
| 13 | | −86.775 | ASP | 0.493 | | | | |
| 14 | IR Cut Filter | Plano | | 0.345 | Glass | 1.517 | 64.2 | |
| 15 | | Plano | | 0.502 | | | | |
| 16 | Image Surface | Plano | | — | | | | |

Note:
Reference wavelength is d-line 587.6 nm

TABLE 4

Aspheric Coefficients

| Surface # | 2 | 3 | 4 | 5 |
|---|---|---|---|---|
| k = | −1.1097E−01 | −9.0000E+01 | −7.8353E+01 | −1.6827E+00 |
| A4 = | 4.3036E−04 | −5.9464E−03 | −2.3947E−02 | −1.0088E−02 |
| A6 = | −2.5886E−04 | −7.4234E−04 | 1.6162E−02 | 2.1448E−02 |
| A8 = | 4.3189E−04 | 6.3862E−03 | 3.7462E−03 | −2.3871E−03 |
| A10 = | −1.3036E−04 | −3.7798E−03 | −6.2693E−03 | −1.4936E−03 |
| A12 = | 1.9938E−05 | 9.9761E−04 | 2.1063E−03 | 3.1563E−04 |
| A14 = | | −1.0236E−04 | −2.5012E−04 | |

| Surface # | 6 | 7 | 8 | 9 |
|---|---|---|---|---|
| k = | 2.6884E+01 | 6.2618E+01 | 2.2077E+01 | 1.1334E+01 |
| A4 = | −1.9569E−03 | −1.0129E−03 | 5.0144E−04 | 7.4208E−04 |
| A6 = | 5.3194E−03 | 4.9980E−03 | 4.6541E−04 | 8.8773E−05 |
| A8 = | 3.8794E−03 | 2.1411E−03 | 5.5222E−06 | |
| A10 = | −2.6605E−03 | −1.3415E−03 | | |
| A12 = | 6.4124E−04 | 3.5851E−04 | | |
| A14 = | −6.4388E−05 | −4.8252E−05 | | |

| Surface # | 10 | 11 | 12 | 13 |
|---|---|---|---|---|
| k = | 6.1920E+00 | 9.5456E−01 | −5.0754E+01 | 9.0000E+01 |
| A4 = | −2.9928E−02 | −4.0209E−02 | −1.9647E−02 | −2.0453E−02 |
| A6 = | −3.1683E−03 | 3.2127E−03 | 7.6900E−03 | 6.4154E−03 |
| A8 = | 2.5016E−03 | 9.6653E−04 | −1.4406E−03 | −1.0130E−03 |
| A10 = | −4.0331E−04 | −3.1184E−04 | 1.5382E−04 | 9.0971E−05 |
| A12 = | 1.3479E−05 | 3.7544E−05 | −9.9307E−06 | −4.9274E−06 |
| A14 = | 2.7139E−06 | −2.1447E−06 | 3.4577E−07 | 1.4562E−07 |
| A16 = | −1.2225E−07 | 4.7091E−08 | −5.3157E−09 | −1.7985E−09 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

2nd Embodiment

| | | | |
|---|---|---|---|
| f [mm] | 11.18 | (R5 − R6)/(R5 + R6) | −0.09 |
| Fno | 2.91 | (R11 + R12)/(R11 − R12) | −0.68 |
| HFOV [deg.] | 18.9 | (\|f/f3\| + \|f/f4\|)/\|f/f2\| | 0.17 |
| V6 | 23.5 | Yc52/f | 0.11 |
| (V2 + V3)/V1 | 0.84 | TL/f | 0.95 |
| Nmax | 1.639 | SD/TD | 0.92 |
| T56/T45 | 0.22 | BL/TD | 0.15 |
| (T12 + T56)/(T23 + T34 + T45) | 0.23 | f/ImgH | 2.80 |
| f/R1 | 4.03 | EPD/ImgH | 0.96 |
| f/R10 | 1.99 | tan(2*HFOV) | 0.78 |
| (R1 + R12)/(R1 − R12) | −0.94 | TL/(Y62 − Y11) | 6.42 |

3rd Embodiment

Figure 3A:
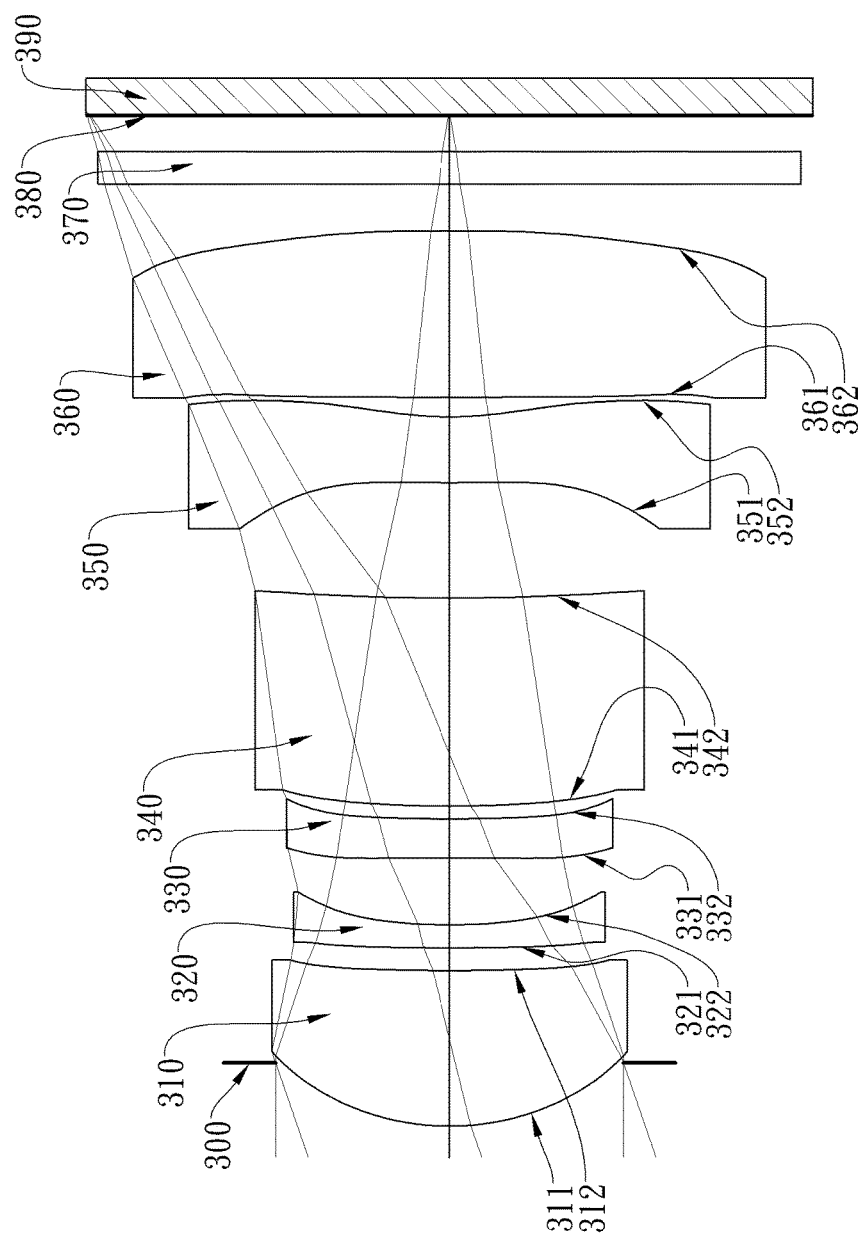
FIG. 3A is a schematic view of an image capturing apparatus according to the 3rd embodiment of the present disclosure.
Figure 3B:
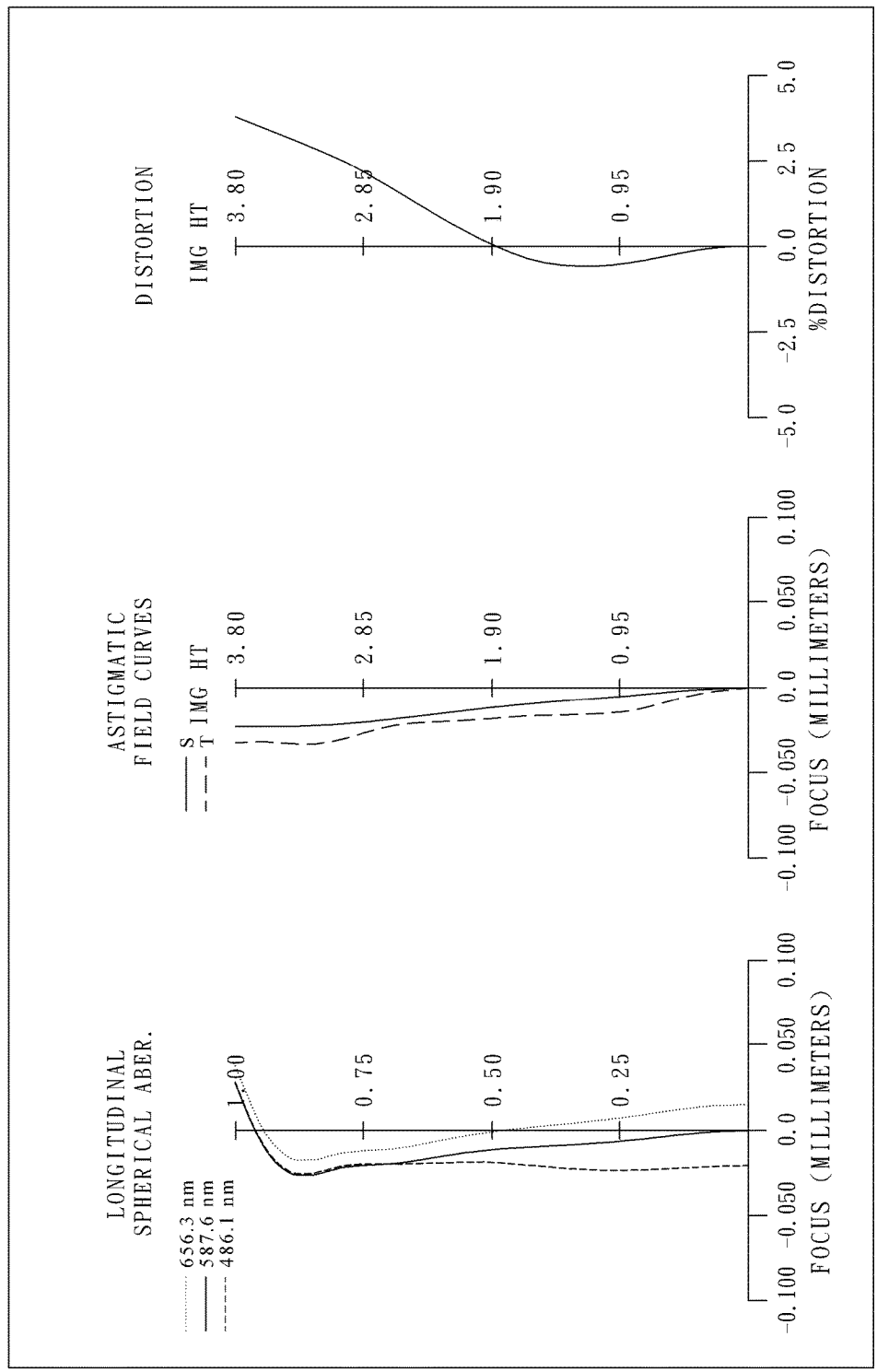
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an image capturing lens system (not otherwise herein labeled) of the present disclosure and an image sensor 390. The image capturing lens system includes, in order from an object side to an image side, an aperture stop 300, a first lens element 310, a second lens element 320, a third lens element 330, a fourth lens element 340, a fifth lens element 350, and a sixth lens element 360.

The first lens element 310 with positive refractive power has an object-side surface 311 being convex in a paraxial region thereof and an image-side surface 312 being concave in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material.

The third lens element 330 with negative refractive power has an object-side surface 331 being concave in a paraxial region thereof and an image-side surface 332 being concave in a paraxial region thereof, which are both aspheric. The third lens element 330 is made of plastic material and has inflection points on the object-side surface 331 thereof.

The fourth lens element 340 with positive refractive power has an object-side surface 341 being convex in a paraxial region thereof and an image-side surface 342 being concave in a paraxial region thereof, which are both aspheric, and the fourth lens element 340 is made of plastic material.

The fifth lens element 350 with negative refractive power has an object-side surface 351 being convex in a paraxial region thereof and an image-side surface 352 being concave in a paraxial region thereof, which are both aspheric and have inflection points. The fifth lens element 350 is made of plastic material.

The sixth lens element 360 with positive refractive power has an object-side surface 361 being convex in a paraxial region thereof and an image-side surface 362 being convex in a paraxial region thereof, which are both aspheric, and the sixth lens element 360 is made of plastic material.

The image capturing lens system further includes an IR cut filter 370 located between the sixth lens element 360 and an image surface 380. The IR cut filter 370 is made of glass material and will not affect the focal length of the image capturing lens system. The image sensor 390 is disposed on or near the image surface 380 of the image capturing lens system.

The detailed optical data of the 3rd embodiment are shown in TABLE 6, and the aspheric surface data are shown in TABLE 7, wherein the units of the curvature radius, the thickness and the focal length are expressed in mm, and HFOV is a half of the maximal field of view.

TABLE 6

(3rd Embodiment)
f = 10.64 mm, Fno = 2.90, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.667 | | | | |
| 2 | Lens 1 | 2.741 | ASP | 1.639 | Plastic | 1.544 | 55.9 | 5.60 |
| 3 | | 21.578 | ASP | 0.239 | | | | |
| 4 | Lens 2 | 20.669 | ASP | 0.250 | Plastic | 1.639 | 23.5 | −12.17 |
| 5 | | 5.624 | ASP | 0.706 | | | | |
| 6 | Lens 3 | −76.923 | ASP | 0.412 | Plastic | 1.639 | 23.5 | −26.77 |
| 7 | | 22.046 | ASP | 0.134 | | | | |
| 8 | Lens 4 | 13.247 | ASP | 2.200 | Plastic | 1.544 | 55.9 | 47.25 |
| 9 | | 25.73 | ASP | 1.216 | | | | |
| 10 | Lens 5 | 19.706 | ASP | 0.694 | Plastic | 1.544 | 55.9 | −8.57 |
| 11 | | 3.725 | ASP | 0.202 | | | | |
| 12 | Lens 6 | 25.794 | ASP | 1.764 | Plastic | 1.639 | 23.5 | 31.43 |
| 13 | | −88.339 | ASP | 0.493 | | | | |
| 14 | IR Cut Filter | Plano | | 0.345 | Glass | 1.517 | 64.2 | |

TABLE 6-continued (3rd Embodiment)
f = 10.64 mm, Fno = 2.90, HFOV = 19.0 deg.

| Surface # | | Curvature Radius | Thickness | Material | Index | Abbe # | Focal Length |
|---|---|---|---|---|---|---|---|
| 15 | | Plano | 0.380 | | | | |
| 16 | Image Surface | Plano | — | | | | |

Note:
Reference wavelength is d-line 587.6 nm

TABLE 7

| Aspheric Coefficients | | | | |
|---|---|---|---|---|
| Surface # | 2 | 3 | 4 | 5 |
| k = | −5.8950E−02 | 9.0000E+01 | 8.9799E+01 | −1.4641E+00 |
| A4 = | 1.5890E−03 | −5.2939E−03 | −2.3016E−02 | −9.9006E−03 |
| A6 = | −2.2361E−04 | −5.8308E−04 | 1.6315E−02 | 2.2302E−02 |
| A8 = | 4.3334E−03 | 6.3359E−03 | 3.7605E−03 | −2.3288E−03 |
| A10 = | −1.2374E−04 | −3.7756E−03 | −6.3530E−03 | −1.4855E−03 |
| A12 = | 2.2772E−05 | 1.0139E−03 | 2.0591E−03 | 2.6942E−04 |
| A14 = | | −1.0486E−04 | −2.4501E−04 | |
| Surface # | 6 | 7 | 8 | 9 |
| k = | 9.0000E+01 | 6.6519E+01 | 2.5817E+01 | −8.4270E+00 |
| A4 = | −2.3023E−03 | 3.0937E−04 | 6.5712E−04 | −2.5994E−04 |
| A6 = | 5.5290E−03 | 4.9138E−03 | 7.2110E−04 | 2.1448E−04 |
| A8 = | 4.0094E−03 | 2.1381E−03 | 7.8495E−05 | −4.2925E−05 |
| A10 = | −2.6329E−03 | −1.3898E−03 | | |
| A12 = | 6.3474E−04 | 3.5156E−04 | | |
| A14 = | −6.6888E−05 | −3.9688E−05 | | |
| Surface # | 10 | 11 | 12 | 13 |
| k = | 2.9378E+01 | −4.0266E−01 | 5.8552E+01 | −9.0000E+01 |
| A4 = | −3.2851E−02 | −4.0133E−02 | −1.8095E−02 | −2.0123E−02 |
| A6 = | −3.6064E−03 | 3.2000E−03 | 7.6026E−03 | 6.2807E−03 |
| A8 = | 2.4620E−03 | 9.5742E−04 | −1.5094E−03 | −1.0107E−03 |
| A10 = | −4.0408E−04 | −3.1231E−04 | 1.5869E−04 | 9.1568E−05 |
| A12 = | 1.3844E−05 | 3.7562E−05 | −9.8999E−06 | −4.9274E−06 |
| A14 = | 2.6644E−06 | −2.1371E−06 | 3.5226E−07 | 1.4504E−07 |
| A16 = | −1.8910E−07 | 4.8404E−08 | −6.4370E−09 | −1.8303E−09 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

| 3rd Embodiment | | | |
|---|---|---|---|
| f [mm] | 10.64 | (R5 − R6)/(R5 + R6) | 1.80 |
| Fno | 2.90 | (R11 + R12)/(R11 − R12) | −0.55 |
| HFOV [deg.] | 19.0 | (|f/f3| + |f/f4|)/|f/f2| | 0.71 |
| V6 | 23.5 | Yc52/f | 0.19 |
| (V2 + V3)/V1 | 0.84 | TL/f | 1.00 |
| Nmax | 1.639 | SD/TD | 0.93 |
| T56/T45 | 0.17 | BL/TD | 0.13 |
| (T12 + T56)/(T23 + T34 + T45) | 0.21 | f/ImgH | 2.80 |
| f/R1 | 3.88 | EPD/ImgH | 0.97 |

TABLE 8-continued

| 3rd Embodiment | | | |
|---|---|---|---|
| f/R10 | 2.86 | tan(2*HFOV) | 0.78 |
| (R1 + R12)/(R1 − R12) | −0.94 | TL/(Y62 − Y11) | 7.29 |

4th Embodiment

Figure 4A:
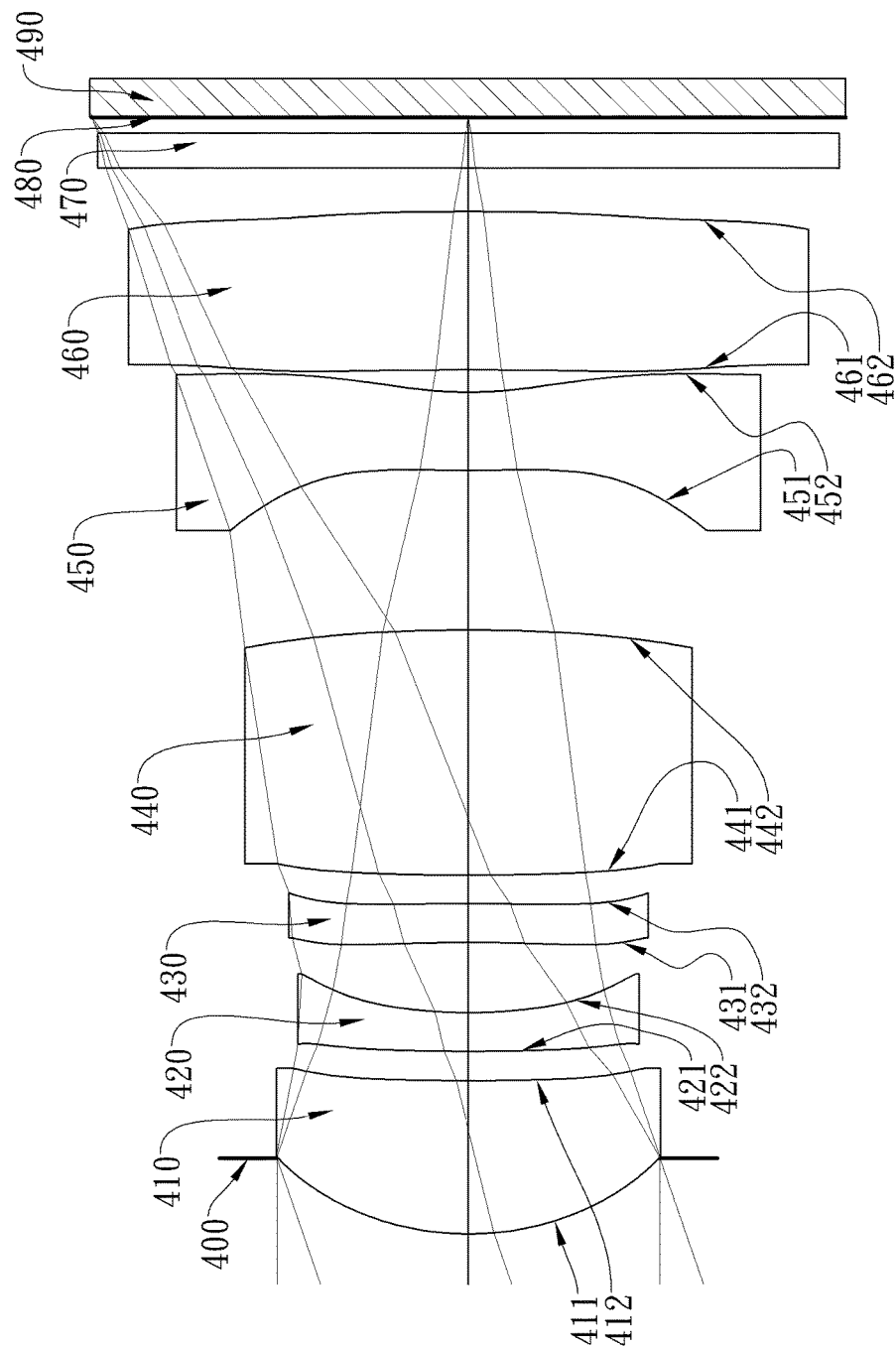
FIG. 4A is a schematic view of an image capturing apparatus according to the 4th embodiment of the present disclosure.
Figure 4B:
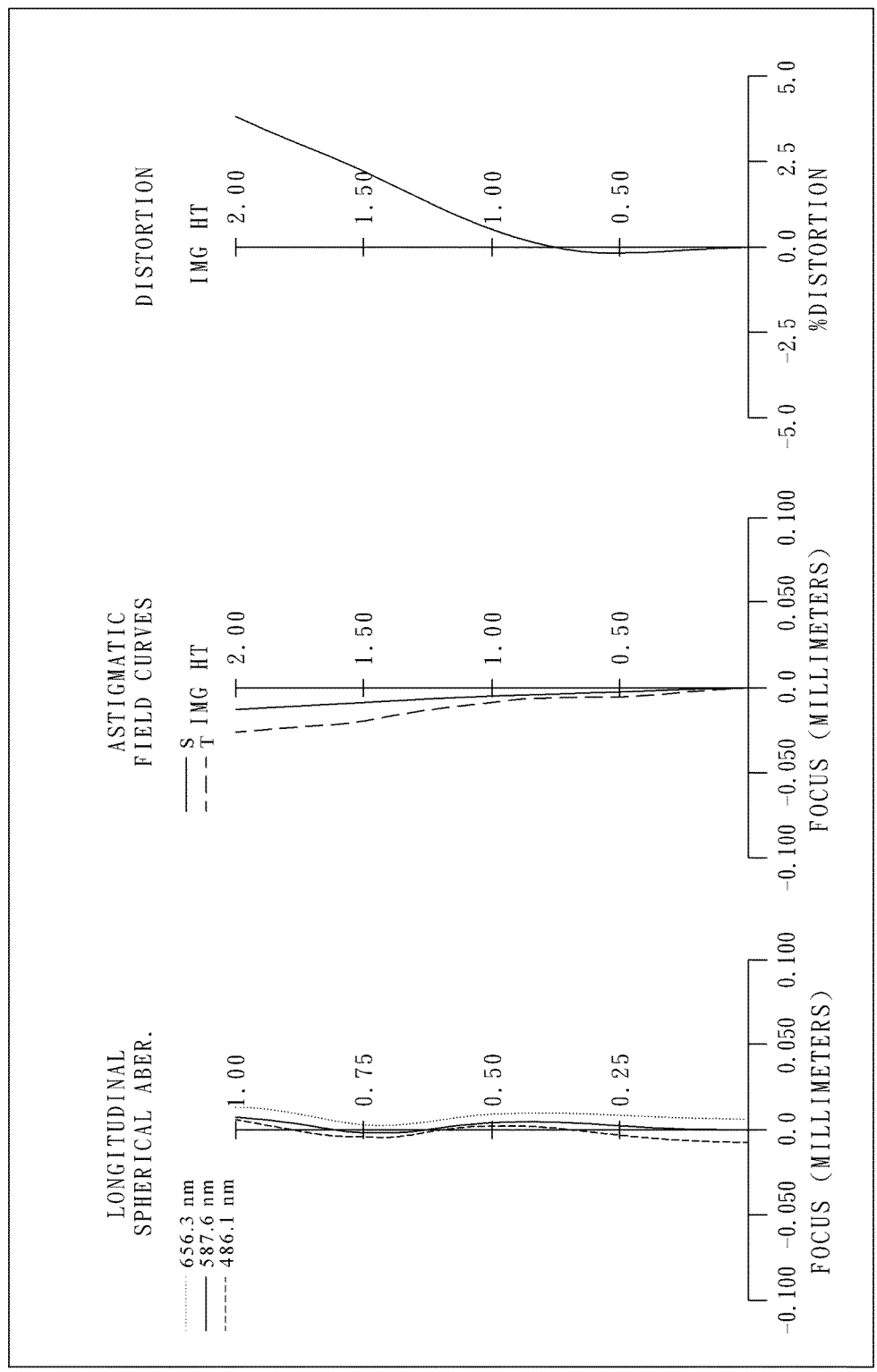
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an image capturing lens system (not otherwise herein labeled) of the present disclosure and an image sensor 490. The image capturing lens system includes, in order from an object side to an image side, an aperture stop 400, a first lens element 410, a second lens element 420, a third lens element 430, a fourth lens element 440, a fifth lens element 450, and a sixth lens element 460.

The first lens element 410 with positive refractive power has an object-side surface 411 being convex in a paraxial region thereof and an image-side surface 412 being concave in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with negative refractive power has an object-side surface 431 being concave in a paraxial region thereof and an image-side surface 432 being convex in a paraxial region thereof, which are both aspheric and have inflection points. The third lens element 430 is made of plastic material.

The fourth lens element 440 with positive refractive power has an object-side surface 441 being convex in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being convex in a paraxial region thereof and an image-side surface 452 being concave in a paraxial region thereof, which are both aspheric and have inflection points. The fifth lens element 450 is made of plastic material.

The sixth lens element 460 with positive refractive power has an object-side surface 461 being concave in a paraxial region thereof and an image-side surface 462 being convex in a paraxial region thereof, which are both aspheric, and the sixth lens element 460 is made of plastic material.

The image capturing lens system further includes an IR cut filter 470 located between the sixth lens element 460 and an image surface 480. The IR cut filter 470 is made of glass material and will not affect the focal length of the image capturing lens system. The image sensor 490 is disposed on or near the image surface 480 of the image capturing lens system.

The detailed optical data of the 4th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(4th Embodiment)
f = 5.58 mm, Fno = 2.75, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.400 | | | | |
| 2 | Lens 1 | 1.546 | ASP | 0.815 | Plastic | 1.544 | 55.9 | 3.12 |
| 3 | | 14.091 | ASP | 0.155 | | | | |
| 4 | Lens 2 | 9.543 | ASP | 0.205 | Plastic | 1.639 | 23.5 | −5.69 |
| 5 | | 2.611 | ASP | 0.371 | | | | |
| 6 | Lens 3 | −11.347 | ASP | 0.205 | Plastic | 1.639 | 23.5 | −29.12 |
| 7 | | −29.285 | ASP | 0.152 | | | | |
| 8 | Lens 4 | 15.165 | ASP | 1.300 | Plastic | 1.544 | 55.9 | 11.96 |
| 9 | | −11.051 | ASP | 0.849 | | | | |
| 10 | Lens 5 | 10.518 | ASP | 0.414 | Plastic | 1.544 | 55.9 | −4.76 |
| 11 | | 2.048 | ASP | 0.117 | | | | |
| 12 | Lens 6 | −186.178 | ASP | 0.842 | Plastic | 1.639 | 23.5 | 95.19 |
| 13 | | −45.930 | ASP | 0.230 | | | | |
| 14 | IR Cut Filter | Plano | | 0.185 | Glass | 1.517 | 64.2 | |
| 15 | | Plano | | 0.083 | | | | |
| 16 | Image Surface | Plano | | — | | | | |

Note:
Reference wavelength is d-line 587.6 nm

TABLE 10

Aspheric Coefficients

| Surface # | 2 | 3 | 4 | 5 |
|---|---|---|---|---|
| k = | −4.7011E−02 | 8.9405E+01 | 8.1022E+01 | −3.8316E+00 |
| A4 = | 1.0072E−02 | −1.9114E−02 | −1.4665E−01 | −7.0331E−02 |
| A6 = | −4.0708E−03 | 7.7240E−03 | 3.6014E−01 | 4.9295E−01 |
| A8 = | 3.4011E−02 | 4.7162E−01 | 2.8994E−01 | −1.7166E−01 |
| A10 = | −3.0225E−02 | −1.0013E+00 | −1.6634E+00 | −3.9175E−01 |
| A12 = | 1.7505E−02 | 9.0859E−01 | 1.8227E+00 | 2.2188E−01 |
| A14 = | | −3.3097E−01 | −7.5139E−01 | |

| Surface # | 6 | 7 | 8 | 9 |
|---|---|---|---|---|
| k = | 6.9809E+01 | −9.0000E+01 | 5.4223E+01 | 6.3041E+01 |
| A4 = | −2.5860E−02 | 1.6955E−03 | 6.9458E−04 | −1.7483E−02 |
| A6 = | 1.2732E−01 | 9.3010E−02 | 2.1789E−02 | 7.8075E−03 |
| A8 = | 3.0614E−01 | 1.5970E−01 | −2.3084E−04 | 6.4803E−04 |
| A10 = | −6.8486E−01 | −3.6935E−01 | | |

TABLE 10-continued

| Aspheric Coefficients | | |
|---|---|---|
| A12 = | 5.7185E−01 | 3.1343E−01 |
| A14 = | −2.0705E−01 | −1.0660E−01 |

| Surface # | 10 | 11 | 12 | 13 |
|---|---|---|---|---|
| k = | 4.4270E+01 | −3.8960E−01 | −9.0000E+01 | −9.0000E+01 |
| A4 = | −2.1155E−01 | −2.4264E−01 | −7.7637E−02 | −9.7173E−02 |
| A6 = | −7.8642E−02 | 6.3585E−02 | 1.5508E−01 | 1.2805E−01 |
| A8 = | 1.8052E−01 | 7.3255E−02 | −1.1280E−01 | −7.5323E−02 |
| A10 = | −1.0363E−01 | −8.1094E−02 | 4.2033E−02 | 2.4102E−02 |
| A12 = | 1.4168E−02 | 3.3897E−02 | −8.8192E−03 | −4.4341E−03 |
| A14 = | 8.5045E−03 | −6.6183E−03 | 1.0860E−03 | 4.4537E−04 |
| A16 = | −2.6762E−03 | 4.9559E−04 | −7.3663E−05 | −1.9787E−05 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

| 4th Embodiment | | | |
|---|---|---|---|
| f [mm] | 5.58 | (R5 − R6)/(R5 + R6) | −0.44 |
| Fno | 2.75 | (R11 + R12)/(R11 − R12) | 1.65 |
| HFOV [deg.] | 19.0 | (|f/f3| + |f/f4|)/|f/f2| | 0.67 |
| V6 | 23.5 | Yc52/f | 0.21 |
| (V2 + V3)/V1 | 0.84 | TL/f | 1.06 |
| Nmax | 1.639 | SD/TD | 0.93 |
| T56/T45 | 0.14 | BL/TD | 0.09 |
| (T12 + T56)/(T23 + T34 + T45) | 0.20 | f/ImgH | 2.79 |
| f/R1 | 3.61 | EPD/ImgH | 1.01 |
| f/R10 | 2.72 | tan(2*HFOV) | 0.78 |
| (R1 + R12)/(R1 − R12) | −0.93 | TL/(Y62 − Y11) | 7.54 |

5th Embodiment

Figure 5A:
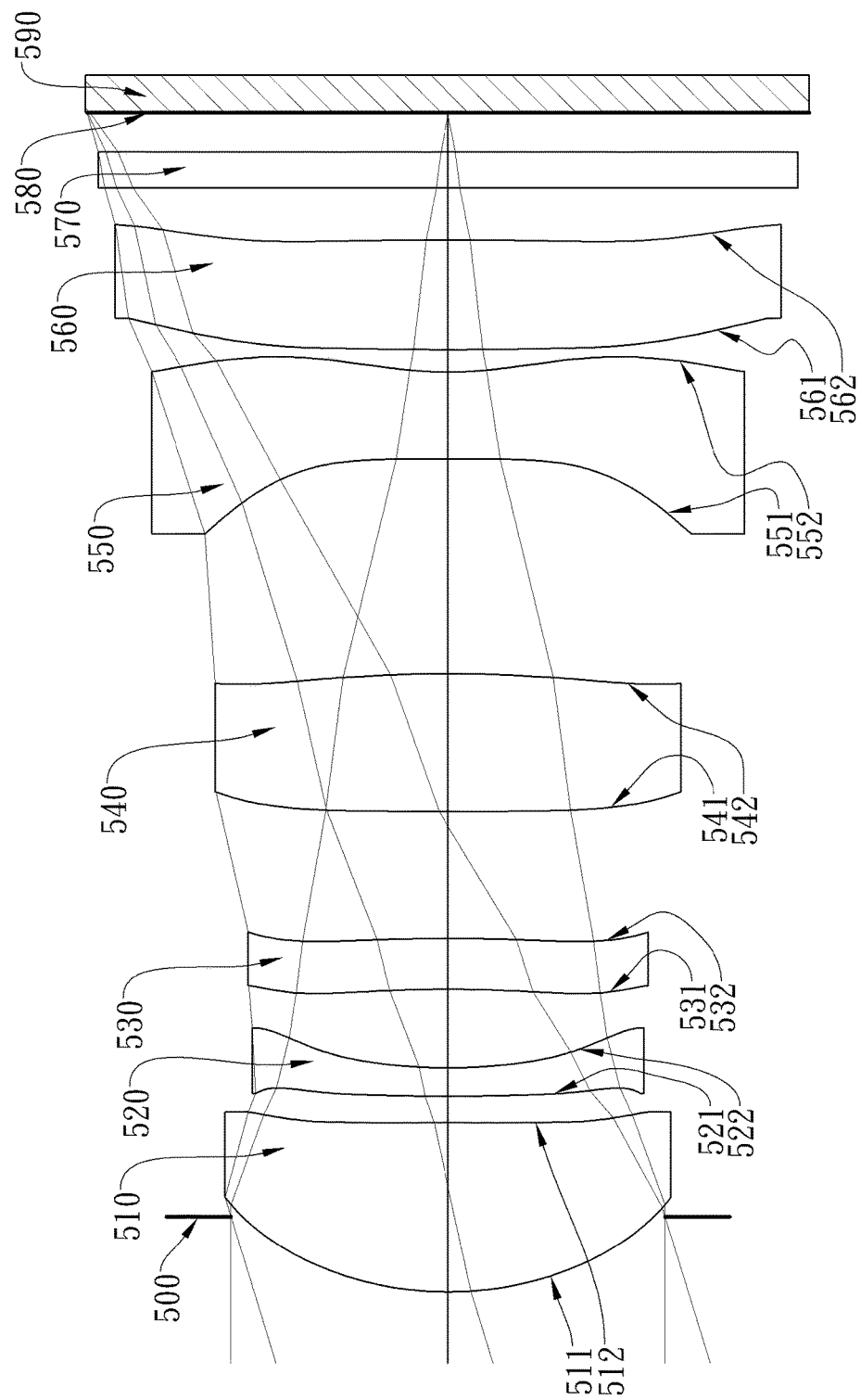
FIG. 5A is a schematic view of an image capturing apparatus according to the 5th embodiment of the present disclosure.
Figure 5B:
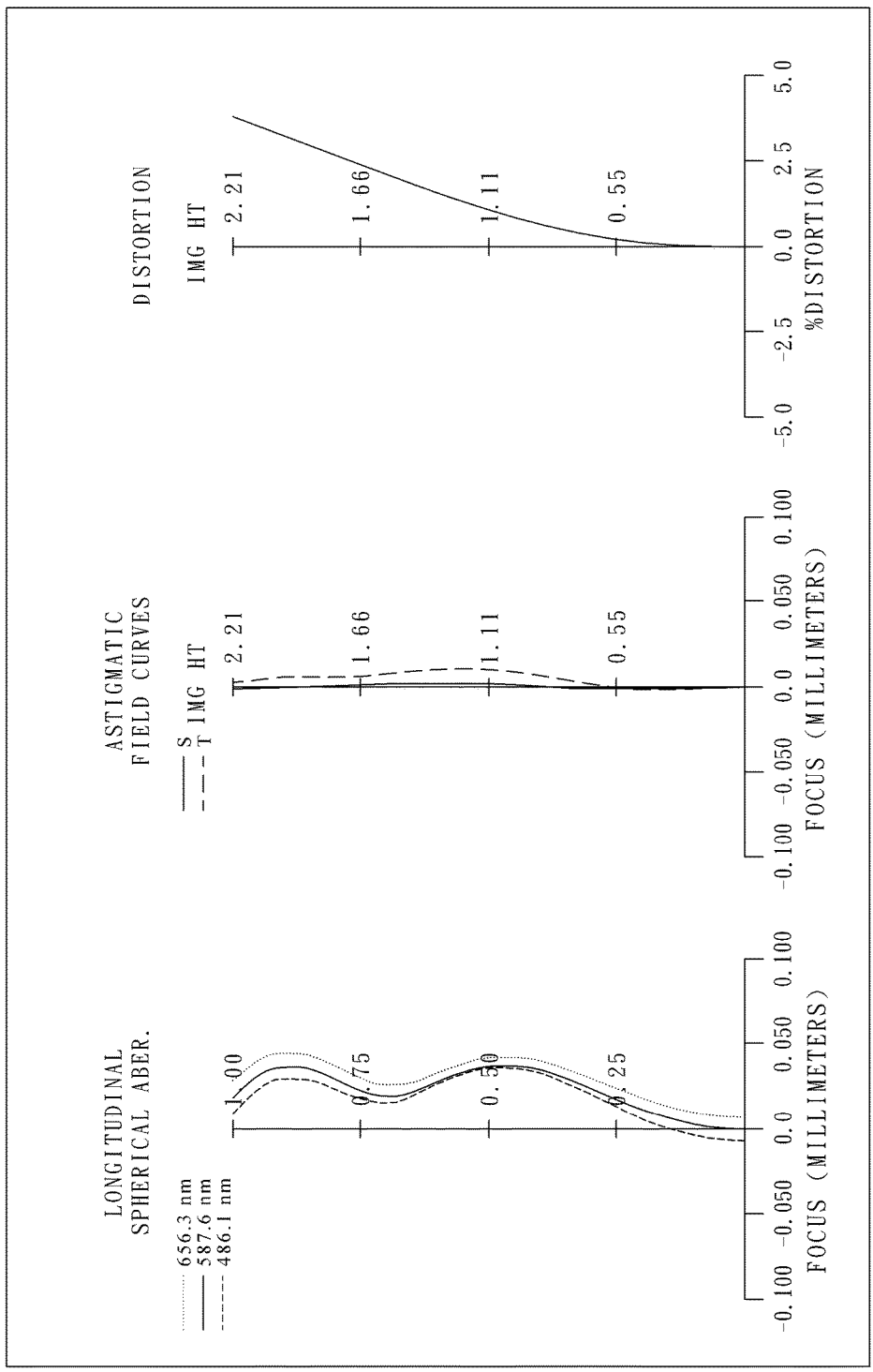
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an image capturing lens system (not otherwise herein labeled) of the present disclosure and an image sensor 590. The image capturing lens system includes, in order from an object side to an image side, an aperture stop 500, a first lens element 510, a second lens element 520, a third lens element 530, a fourth lens element 540, a fifth lens element 550, and a sixth lens element 560.

The first lens element 510 with positive refractive power has an object-side surface 511 being convex in a paraxial region thereof and an image-side surface 512 being concave in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material.

The third lens element 530 with negative refractive power has an object-side surface 531 being concave in a paraxial region thereof and an image-side surface 532 being convex in a paraxial region thereof, which are both aspheric and have inflection points. The third lens element 530 is made of plastic material.

The fourth lens element 540 with positive refractive power has an object-side surface 541 being convex in a paraxial region thereof and an image-side surface 542 being convex in a paraxial region thereof, which are both aspheric, and the fourth lens element 540 is made of plastic material.

The fifth lens element 550 with negative refractive power has an object-side surface 551 being convex in a paraxial region thereof and an image-side surface 552 being concave in a paraxial region thereof, which are both aspheric and have inflection points. The fifth lens element 550 is made of plastic material.

The sixth lens element 560 with positive refractive power has an object-side surface 561 being convex in a paraxial region thereof and an image-side surface 562 being convex in a paraxial region thereof, which are both aspheric, and the sixth lens element 560 is made of plastic material.

The image capturing lens system further includes an IR cut filter 570 located between the sixth lens element 560 and an image surface 580. The IR cut filter 570 is made of glass material and will not affect the focal length of the image capturing lens system. The image sensor 590 is disposed on or near the image surface 580 of the image capturing lens system.

The detailed optical data of the 5th embodiment are shown in TABLE 12, and the aspheric surface data are shown in TABLE 13, wherein the units of the curvature radius, the thickness and the focal length are expressed in mm, and HFOV is a half of the maximal field of view.

TABLE 12

(5th Embodiment)
f = 6.91 mm, Fno = 2.60, HFOV = 17.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.464 | | | | |
| 2 | Lens 1 | 2.065 | ASP | 1.038 | Plastic | 1.544 | 56.0 | 3.85 |
| 3 | | 117.832 | ASP | 0.162 | | | | |
| 4 | Lens 2 | 11.220 | ASP | 0.174 | Plastic | 1.639 | 23.5 | −7.04 |
| 5 | | 3.191 | ASP | 0.480 | | | | |
| 6 | Lens 3 | −9.505 | ASP | 0.314 | Plastic | 1.639 | 23.5 | −53.41 |
| 7 | | −13.347 | ASP | 0.777 | | | | |
| 8 | Lens 4 | 58.409 | ASP | 0.847 | Plastic | 1.544 | 56.0 | 14.33 |
| 9 | | −8.955 | ASP | 1.311 | | | | |
| 10 | Lens 5 | 28.954 | ASP | 0.538 | Plastic | 1.530 | 55.8 | −4.83 |
| 11 | | 2.336 | ASP | 0.136 | | | | |
| 12 | Lens 6 | 18.159 | ASP | 0.671 | Plastic | 1.660 | 20.4 | 21.86 |
| 13 | | −69.232 | ASP | 0.320 | | | | |
| 14 | IR Cut Filter | Plano | | 0.224 | Glass | 1.517 | 64.2 | |
| 15 | | Plano | | 0.240 | | | | |
| 16 | Image Surface | Plano | | — | | | | |

Note:
Reference wavelength is d-line 587.6 nm

TABLE 13

Aspheric Coefficients

| Surface # | 2 | 3 | 4 | 5 |
|---|---|---|---|---|
| k = | −6.6026E−02 | −9.0000E+01 | 8.2722E+01 | −3.4351E+00 |
| A4 = | 4.6153E−03 | −6.9674E−03 | −8.4746E−02 | −4.3567E−02 |
| A6 = | −1.0131E−03 | 1.2489E−04 | 1.4275E−01 | 1.8481E−01 |
| A8 = | 9.0680E−03 | 1.2745E−01 | 7.6595E−02 | −4.8418E−02 |
| A10 = | −5.8063E−03 | −1.8417E−01 | −3.0862E−01 | −7.3777E−02 |
| A12 = | 2.0279E−03 | 1.1595E−01 | 2.3143E−01 | 2.7008E−02 |
| A14 = | | −2.8834E−02 | −6.5222E−02 | |

| Surface # | 6 | 7 | 8 | 9 |
|---|---|---|---|---|
| k = | 4.5463E+01 | 9.0000E+01 | −6.5486E+01 | 1.2606E+01 |
| A4 = | −1.3409E−02 | −4.3843E−03 | 7.6047E−03 | 7.3818E−04 |
| A6 = | 4.9674E−02 | 3.4562E−02 | 1.2283E−02 | 5.4036E−03 |
| A8 = | 8.2393E−02 | 4.3081E−02 | −1.7263E−03 | 1.0641E−03 |
| A10 = | −1.2616E−01 | −6.7770E−02 | | |
| A12 = | 7.3210E−02 | 4.0342E−02 | | |
| A14 = | −1.7538E−02 | −8.9785E−03 | | |

| Surface # | 10 | 11 | 12 | 13 |
|---|---|---|---|---|
| k = | 9.0000E+01 | −3.1661E−01 | −4.2455E+01 | −9.0000E+01 |
| A4 = | −1.3020E−01 | −1.6401E−01 | −4.4497E−02 | −3.2959E−02 |
| A6 = | −3.0898E−02 | 2.6925E−02 | 6.2257E−02 | 4.7905E−02 |
| A8 = | 4.7912E−02 | 1.9969E−02 | −3.0313E−02 | −2.0905E−02 |
| A10 = | −1.8885E−02 | −1.4977E−02 | 7.7447E−03 | 4.5623E−03 |
| A12 = | 1.9467E−03 | 4.3077E−03 | −1.1290E−03 | −5.5543E−04 |
| A14 = | 7.6725E−04 | −5.7821E−04 | 9.4109E−05 | 3.8858E−05 |
| A16 = | −1.7120E−04 | 2.9477E−05 | −3.9279E−06 | −1.5115E−06 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

| 5th Embodiment | | | |
|---|---|---|---|
| f [mm] | 6.91 | (R5 − R6)/(R5 + R6) | −0.17 |
| Fno | 2.60 | (R11 + R12)/(R11 − R12) | −0.58 |
| HFOV [deg.] | 17.0 | (|f/f3| + |f/f4|)/|f/f2| | 0.62 |
| V6 | 20.4 | Yc52/f | 0.15 |
| (V2 + V3)/V1 | 0.84 | TL/f | 1.05 |
| Nmax | 1.660 | SD/TD | 0.93 |
| T56/T45 | 0.10 | BL/TD | 0.12 |
| (T12 + T56)/(T23 + T34 + T45) | 0.12 | f/ImgH | 3.13 |

TABLE 14-continued

5th Embodiment

| | | | |
|---|---|---|---|
| f/R1 | 3.34 | EPD/ImgH | 1.20 |
| f/R10 | 2.96 | tan(2*HFOV) | 0.67 |
| (R1 + R12)/(R1 − R12) | −0.94 | TL/(Y62 − Y11) | 10.71 |

6th Embodiment

Figure 6A:
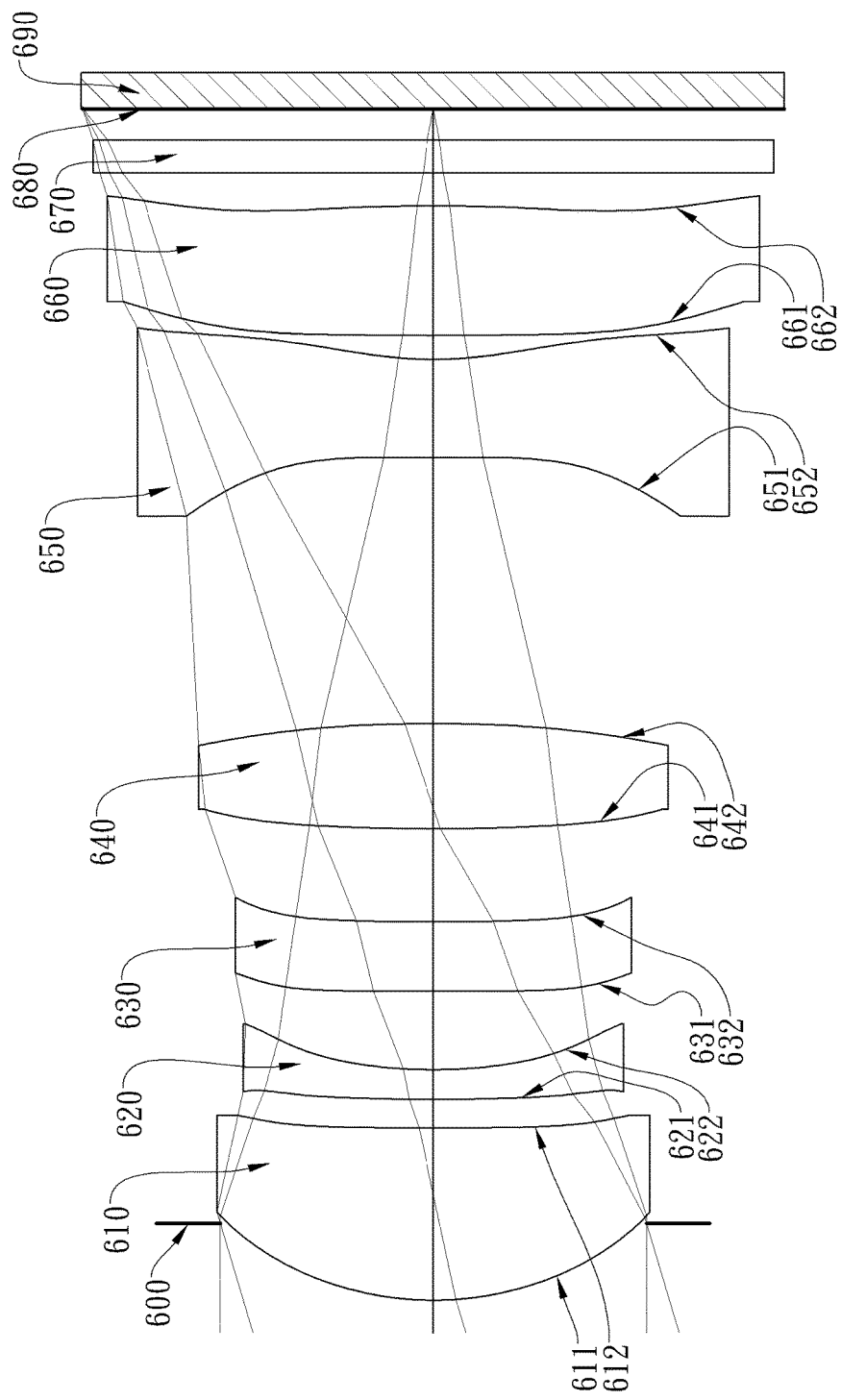
FIG. 6A is a schematic view of an image capturing apparatus according to the 6th embodiment of the present disclosure.
Figure 6B:
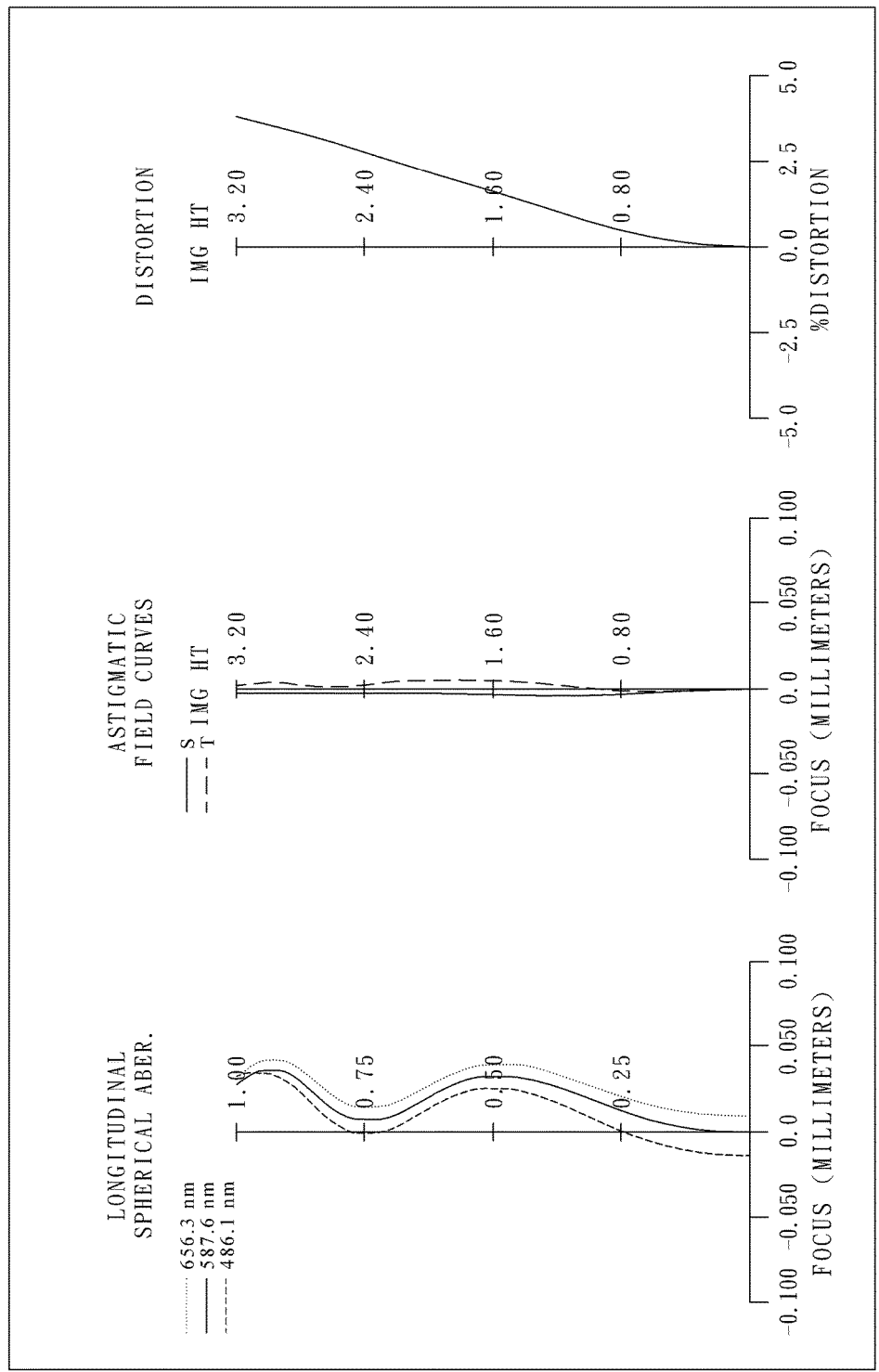
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an image capturing lens system (not otherwise herein labeled) of the present disclosure and an image sensor 690. The image capturing lens system includes, in order from an object side to an image side, an aperture stop 600, a first lens element 610, a second lens element 620, a third lens element 630, a fourth lens element 640, a fifth lens element 650, and a sixth lens element 660.

The first lens element 610 with positive refractive power has an object-side surface 611 being convex in a paraxial region thereof and an image-side surface 612 being concave in a paraxial region thereof, which are both aspheric, and the first lens element 610 is made of plastic material.

The second lens element 620 with negative refractive power has an object-side surface 621 being convex in a paraxial region thereof and an image-side surface 622 being concave in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric. The third lens element 630 is made of plastic material and the object-side surface 631 of which has inflection points.

The fourth lens element 640 with positive refractive power has an object-side surface 641 being convex in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being convex in a paraxial region thereof and an image-side surface 652 being concave in a paraxial region thereof, which are both aspheric and have inflection points. The fifth lens element 650 is made of plastic material.

The sixth lens element 660 with positive refractive power has an object-side surface 661 being convex in a paraxial region thereof and an image-side surface 662 being convex in a paraxial region thereof, which are both aspheric, and the sixth lens element 660 is made of plastic material.

The image capturing lens system further includes an IR cut filter 670 located between the sixth lens element 660 and an image surface 680. The IR cut filter 670 is made of glass material and will not affect the focal length of the image capturing lens system. The image sensor 690 is disposed on or near the image surface 680 of the image capturing lens system.

The detailed optical data of the 6th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(6th Embodiment)
f = 10.29 mm, Fno = 2.65, HFOV = 16.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.700 | | | | |
| 2 | Lens 1 | 2.969 | ASP | 1.573 | Plastic | 1.535 | 55.8 | 5.95 |
| 3 | | 36.121 | ASP | 0.262 | | | | |
| 4 | Lens 2 | 17.158 | ASP | 0.270 | Plastic | 1.639 | 23.3 | −9.20 |
| 5 | | 4.349 | ASP | 0.715 | | | | |
| 6 | Lens 3 | 84.911 | ASP | 0.633 | Plastic | 1.530 | 55.8 | −92.17 |
| 7 | | 30.928 | ASP | 0.854 | | | | |
| 8 | Lens 4 | 21.778 | ASP | 0.958 | Plastic | 1.530 | 55.8 | 16.36 |
| 9 | | −14.185 | ASP | 2.428 | | | | |
| 10 | Lens 5 | 43.652 | ASP | 0.894 | Plastic | 1.530 | 55.8 | −6.92 |
| 11 | | 3.358 | ASP | 0.218 | | | | |
| 12 | Lens 6 | 33.517 | ASP | 1.189 | Plastic | 1.639 | 23.3 | 17.26 |
| 13 | | −16.204 | ASP | 0.300 | | | | |
| 14 | IR Cut Filter | Plano | | 0.300 | Glass | 1.517 | 64.2 | |
| 15 | | Plano | | 0.281 | | | | |
| 16 | Image Surface | Plano | | — | | | | |

Note:
Reference wavelength is d-line 587.6 nm

TABLE 16

Aspheric Coefficients

| Surface # | 2 | 3 | 4 | 5 |
|---|---|---|---|---|
| k = | −7.4986E−02 | 9.0000E+01 | 8.3391E+01 | −2.9661E+00 |
| A4 = | 1.1651E−03 | −2.3906E−03 | −2.2896E−02 | −1.1158E−02 |
| A6 = | −1.8684E−04 | 9.5710E−05 | 1.6533E−02 | 2.1756E−02 |
| A8 = | 4.3820E−04 | 6.2465E−03 | 3.7720E−03 | −2.3316E−03 |
| A10 = | −1.1942E−04 | −3.8193E−03 | −6.3869E−03 | −1.5179E−03 |
| A12 = | 1.8372E−05 | 1.0129E−03 | 2.0260E−03 | 2.3921E−04 |
| A14 = | | −1.0708E−04 | −2.4115E−04 | |

| Surface # | 6 | 7 | 8 | 9 |
|---|---|---|---|---|
| k = | −9.0000E+01 | 8.5447E+01 | −2.8282E+01 | 3.0780E+01 |
| A4 = | −4.9618E−03 | 3.5629E−04 | 3.9064E−04 | −1.8265E−03 |
| A6 = | 5.7146E−03 | 4.2327E−03 | 1.1892E−03 | 2.8991E−04 |
| A8 = | 4.0341E−03 | 2.1346E−03 | −6.9347E−05 | 5.1120E−05 |
| A10 = | −2.6169E−03 | −1.4028E−03 | 1.2647E−06 | −2.1167E−07 |
| A12 = | 6.3931E−04 | 3.5252E−04 | | |
| A14 = | −6.5230E−05 | −3.3367E−05 | | |

| Surface # | 10 | 11 | 12 | 13 |
|---|---|---|---|---|
| k = | −8.0856E+01 | −9.0330E−02 | −5.5110E+01 | 6.2595E+00 |
| A4 = | −3.0613E−02 | −4.2786E−02 | −1.0456E−02 | −1.3095E−03 |
| A6 = | −3.3756E−03 | 3.1872E−03 | 7.0995E−03 | 4.3723E−03 |
| A8 = | 2.3475E−03 | 9.7461E−04 | −1.4845E−03 | −9.4105E−04 |
| A10 = | −3.9401E−04 | −3.1169E−04 | 1.6146E−04 | 9.3942E−05 |
| A12 = | 1.6791E−05 | 3.7566E−05 | −9.8693E−06 | −4.9655E−06 |
| A14 = | 2.8211E−06 | −2.1410E−06 | 3.4418E−07 | 1.4599E−07 |
| A16 = | −2.7409E−07 | 4.6970E−08 | −6.6109E−09 | −2.8962E−09 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

6th Embodiment

| | | | |
|---|---|---|---|
| f [mm] | 10.29 | (R5 − R6)/(R5 + R6) | 0.47 |
| Fno | 2.65 | (R11 + R12)/(R11 − R12) | 0.35 |
| HFOV [deg.] | 16.6 | (|f/f3| + |ff4|)/|f/f2| | 0.66 |
| V6 | 23.3 | Yc52/f | — |
| (V2 + V3)/V1 | 1.42 | TL/f | 1.06 |
| Nmax | 1.639 | SD/TD | 0.93 |
| T56/T45 | 0.09 | BL/TD | 0.09 |
| (T12 + T56)/(T23 + T34 + T45) | 0.12 | f/ImgH | 3.21 |
| f/R1 | 3.46 | EPD/ImgH | 1.21 |
| f/R10 | 3.06 | tan(2*HFOV) | 0.65 |
| (R1 + R12)/(R1 − R12) | −0.69 | TL/(Y62 − Y11) | 10.84 |

7th Embodiment

Figure 7A:
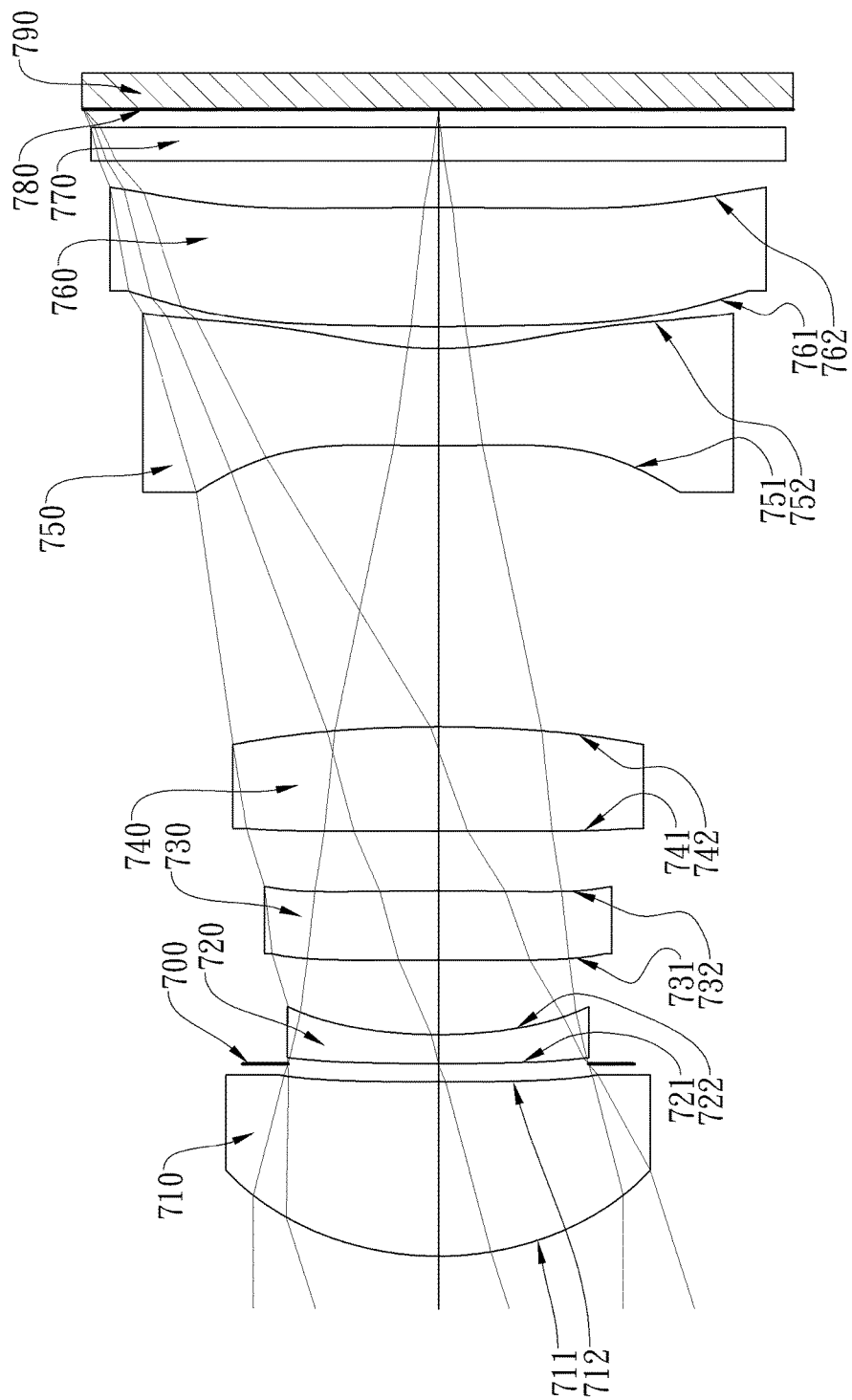
FIG. 7A is a schematic view of an image capturing apparatus according to the 7th embodiment of the present disclosure.
Figure 7B:
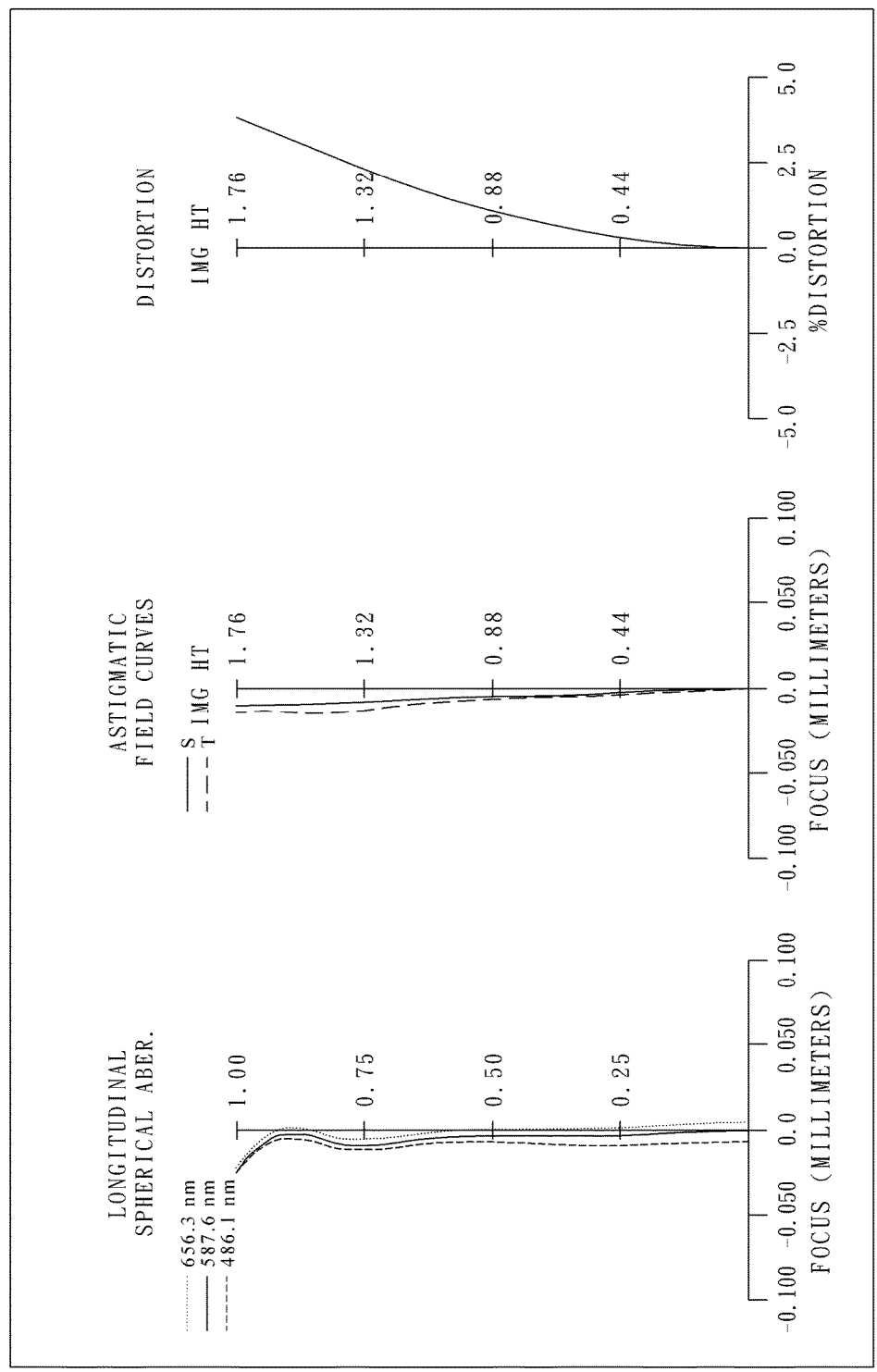
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an image capturing lens system (not otherwise herein labeled) of the present disclosure and an image sensor 790. The image capturing lens system includes, in order from an object side to an image side, a first lens element 710, an aperture stop 700, a second lens element 720, a third lens element 730, a fourth lens element 740, a fifth lens element 750, and a sixth lens element 760.

The first lens element 710 with positive refractive power has an object-side surface 711 being convex in a paraxial region thereof and an image-side surface 712 being concave in a paraxial region thereof, which are both aspheric, and the first lens element 710 is made of plastic material.

The second lens element 720 with negative refractive power has an object-side surface 721 being convex in a paraxial region thereof and an image-side surface 722 being concave in a paraxial region thereof, which are both aspheric, and the second lens element 720 is made of plastic material.

The third lens element 730 with positive refractive power has an object-side surface 731 being convex in a paraxial region thereof and an image-side surface 732 being convex in a paraxial region thereof, which are both aspheric and have inflection points. The third lens element 730 is made of plastic material.

The fourth lens element 740 with positive refractive power has an object-side surface 741 being concave in a paraxial region thereof and an image-side surface 742 being convex in a paraxial region thereof, which are both aspheric, and the fourth lens element 740 is made of plastic material.

The fifth lens element 750 with negative refractive power has an object-side surface 751 being convex in a paraxial region thereof and an image-side surface 752 being concave in a paraxial region thereof, which are both aspheric and have inflection points. The fifth lens element 750 is made of plastic material.

The sixth lens element 760 with positive refractive power has an object-side surface 761 being convex in a paraxial region thereof and an image-side surface 762 being convex in a paraxial region thereof, which are both aspheric, and the sixth lens element 760 is made of plastic material.

The image capturing lens system further includes an IR cut filter 770 located between the sixth lens element 760 and an image surface 780. The IR cut filter 770 is made of glass material and will not affect the focal length of the image capturing lens system. The image sensor 790 is disposed on or near the image surface 780 of the image capturing lens system.

The detailed optical data of the 7th embodiment are shown in TABLE 18, and the aspheric surface data are shown in TABLE 19, wherein the units of the curvature radius, the thickness and the focal length are expressed in mm, and HFOV is a half of the maximal field of view.

TABLE 18

(7th Embodiment)
f = 5.32 mm, Fno = 2.90, HFOV = 17.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.592 | ASP | 0.865 | Plastic | 1.535 | 55.8 | 3.24 |
| 2 | | 15.551 | ASP | 0.090 | | | | |
| 3 | Ape. Stop | Plano | | 0.000 | | | | |
| 4 | Lens 2 | 9.569 | ASP | 0.145 | Plastic | 1.633 | 23.4 | −4.99 |
| 5 | | 2.362 | ASP | 0.369 | | | | |
| 6 | Lens 3 | 312.064 | ASP | 0.342 | Plastic | 1.530 | 55.8 | 36.58 |
| 7 | | −20.665 | ASP | 0.297 | | | | |
| 8 | Lens 4 | −1946.05 | ASP | 0.518 | Plastic | 1.530 | 55.8 | 13.83 |
| 9 | | −7.303 | ASP | 1.394 | | | | |
| 10 | Lens 5 | 9.247 | ASP | 0.482 | Plastic | 1.514 | 56.8 | −4.34 |
| 11 | | 1.766 | ASP | 0.109 | | | | |
| 12 | Lens 6 | 13.578 | ASP | 0.593 | Plastic | 1.639 | 23.3 | 17.71 |
| 13 | | −66.641 | ASP | 0.230 | | | | |
| 14 | IR Cut Filter | Plano | | 0.165 | Glass | 1.517 | 64.2 | |
| 15 | | Plano | | 0.091 | | | | |
| 16 | Image Surface | Plano | | — | | | | |

Note:
Reference wavelength is d-line 587.6 nm

TABLE 19

Aspheric Coefficients

| Surface # | 1 | 2 | 4 | 5 |
|---|---|---|---|---|
| k = | −2.5132E−02 | 8.5297E+01 | 8.1337E+01 | −3.0776E+00 |
| A4 = | 1.0186E−02 | −1.2236E−02 | −1.3874E−01 | −6.7255E−02 |
| A6 = | −7.0641E−03 | 8.8111E−03 | 3.2515E−01 | 4.3497E−01 |
| A8 = | 2.9171E−02 | 4.0650E−01 | 2.5039E−01 | −1.5554E−01 |
| A10 = | −2.5492E−02 | −8.3341E−01 | −1.3843E+00 | −3.3494E−01 |
| A12 = | 1.4564E−02 | 7.6893E−01 | 1.4322E+00 | 1.7974E−01 |
| A14 = | | −3.0796E−01 | −5.4095E−01 | |

| Surface # | 6 | 7 | 8 | 9 |
|---|---|---|---|---|
| k = | −9.0000E+01 | −7.1654E+01 | 9.0000E+01 | 3.0656E+01 |
| A4 = | −3.1413E−02 | 2.8313E−03 | 1.3249E−03 | −1.1078E−02 |
| A6 = | 1.1386E−01 | 8.2738E−02 | 2.3430E−02 | 5.6798E−03 |
| A8 = | 2.6692E−01 | 1.3806E−01 | −4.8133E−03 | 3.5729E−03 |
| A10 = | −5.6639E−01 | −3.0693E−01 | −4.3114E−05 | 1.4912E−04 |
| A12 = | 4.5620E−01 | 2.5174E−01 | | |
| A14 = | −1.6375E−01 | −7.6970E−02 | | |

| Surface # | 10 | 11 | 12 | 13 |
|---|---|---|---|---|
| k = | −3.9272E+01 | −1.5174E−01 | 5.4004E+01 | 9.0000E+01 |
| A4 = | −1.8675E−01 | −2.5697E−01 | −6.2043E−02 | −3.0781E−02 |
| A6 = | −6.5742E−02 | 6.0816E−02 | 1.3525E−01 | 9.0619E−02 |
| A8 = | 1.5379E−01 | 6.4143E−02 | −9.6244E−02 | −6.0158E−02 |
| A10 = | −8.5753E−02 | −6.7558E−02 | 3.5069E−02 | 1.9530E−02 |
| A12 = | 1.1999E−02 | 2.7002E−02 | −7.1187E−03 | −3.4860E−03 |
| A14 = | 6.6836E−03 | −5.0795E−03 | 8.1125E−04 | 3.6030E−04 |
| A16 = | −2.1514E−03 | 3.6109E−04 | −5.0376E−05 | −2.4081E−05 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

| 7th Embodiment | | | |
|---|---|---|---|
| f [mm] | 5.32 | (R5 − R6)/(R5 + R6) | 1.14 |
| Fno | 2.90 | (R11 + R12)/(R11 − R12) | −0.66 |
| HFOV [deg.] | 17.7 | (\|f/f3\| + \|f/f4\|)/f/f2\| | 0.50 |
| V6 | 23.3 | Yc52/f | — |
| (V2 + V3)/V1 | 1.42 | TL/f | 1.07 |
| Nmax | 1.639 | SD/TD | 0.82 |
| T56/T45 | 0.08 | BL/TD | 0.09 |
| (T12 + T56)/(T23 + T34 + T45) | 0.10 | f/ImgH | 3.02 |
| f/R1 | 3.34 | EPD/ImgH | 1.04 |
| f/R10 | 3.01 | tan(2*HFOV) | 0.71 |
| (R1 + R12)/(R1 − R12) | −0.95 | TL/(Y62 − Y11) | 9.86 |

8th Embodiment

Figure 8A:
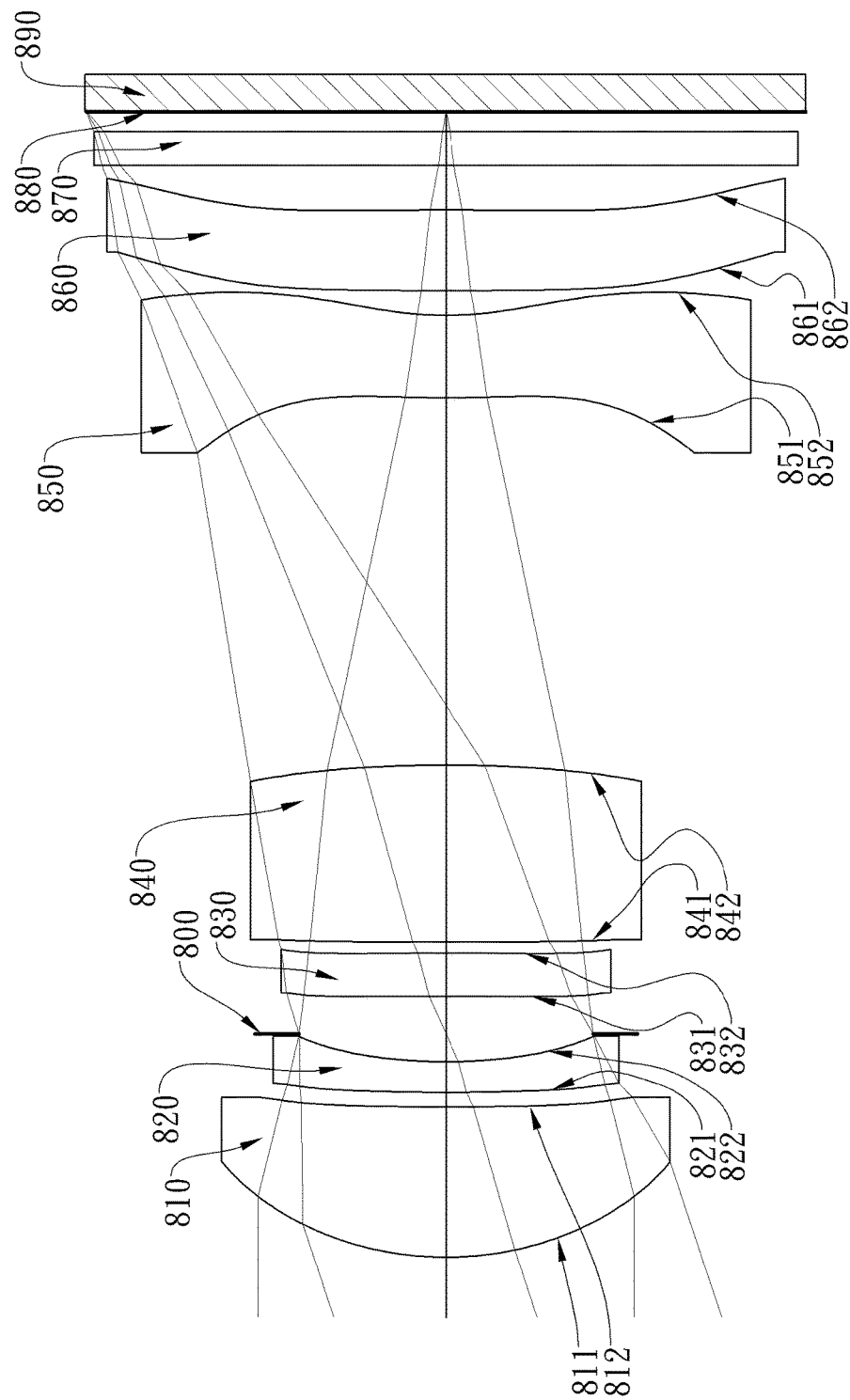
FIG. 8A is a schematic view of an image capturing apparatus according to the 8th embodiment of the present disclosure.
Figure 8B:
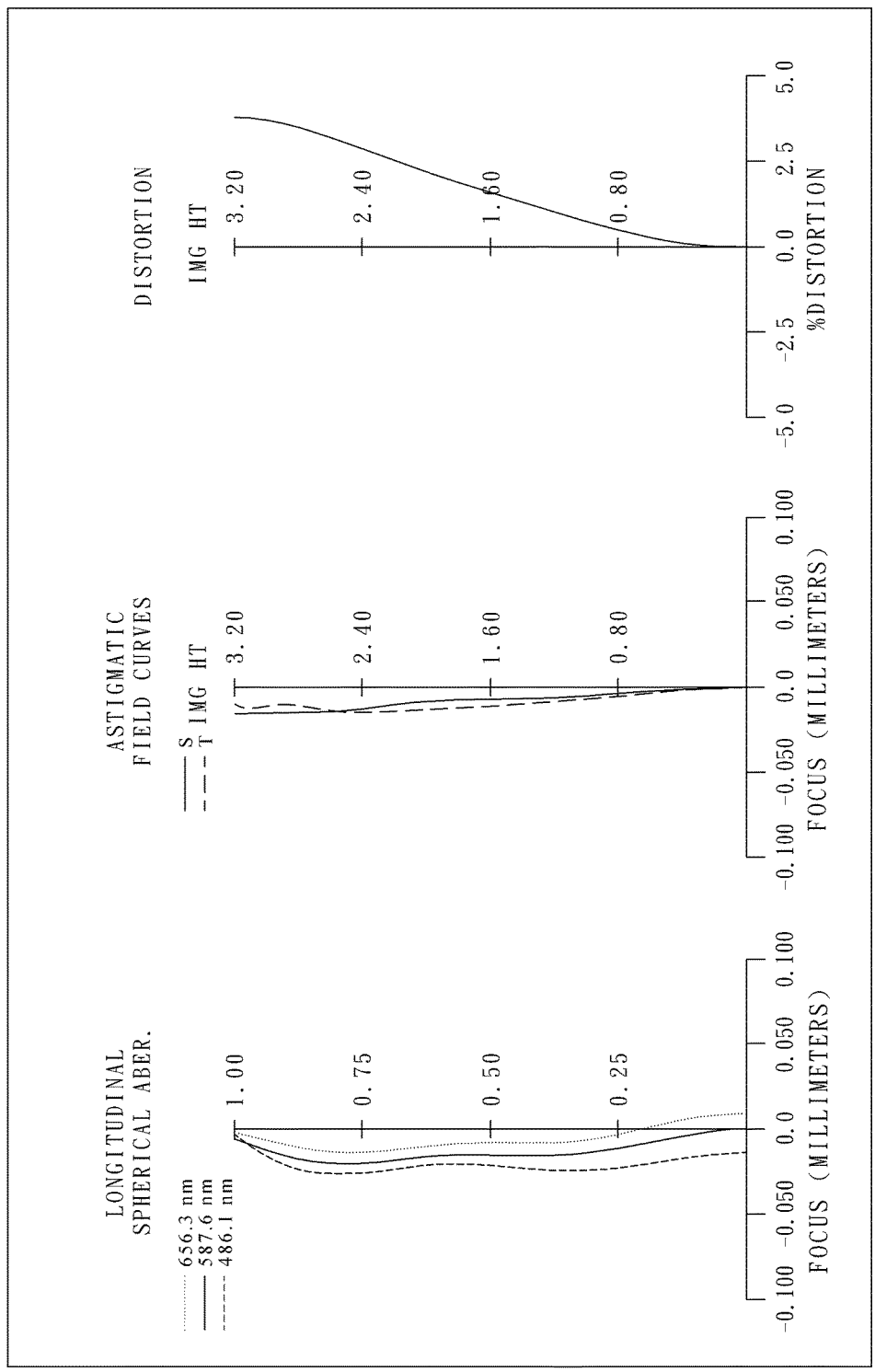
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an image capturing lens system (not otherwise herein labeled) of the present disclosure and an image sensor 890. The image capturing lens system includes, in order from an object side to an image side, a first lens element 810, a second lens element 820, an aperture stop 800, a third lens element 830, a fourth lens element 840, a fifth lens element 850, and a sixth lens element 860, wherein the image capturing lens system has a total of six lens elements with refractive power.

The first lens element 810 with positive refractive power has an object-side surface 811 being convex in a paraxial region thereof and an image-side surface 812 being concave in a paraxial region thereof, which are both aspheric, and the first lens element 810 is made of plastic material.

The second lens element 820 with negative refractive power has an object-side surface 821 being convex in a paraxial region thereof and an image-side surface 822 being concave in a paraxial region thereof, which are both aspheric, and the second lens element 820 is made of plastic material.

The third lens element 830 with positive refractive power has an object-side surface 831 being concave in a paraxial region thereof and an image-side surface 832 being convex in a paraxial region thereof, which are both aspheric and have inflection points. The third lens element 830 is made of plastic material.

The fourth lens element 840 with positive refractive power has an object-side surface 841 being convex in a paraxial region thereof and an image-side surface 842 being convex in a paraxial region thereof, which are both aspheric, and the fourth lens element 840 is made of plastic material.

The fifth lens element 850 with negative refractive power has an object-side surface 851 being convex in a paraxial region thereof and an image-side surface 852 being concave in a paraxial region thereof, which are both aspheric and have inflection points. The fifth lens element 850 is made of plastic material.

The sixth lens element 860 with positive refractive power has an object-side surface 861 being convex in a paraxial region thereof and an image-side surface 862 being convex in a paraxial region thereof, which are both aspheric, and the sixth lens element 860 is made of plastic material.

The image capturing lens system further includes an IR cut filter 870 located between the sixth lens element 860 and an image surface 880. The IR cut filter 870 is made of glass material and will not affect the focal length of the image capturing lens system. The image sensor 890 is disposed on or near the image surface 880 of the image capturing lens system.

The detailed optical data of the 8th embodiment are shown in TABLE 21, and the aspheric surface data are shown in TABLE 22, wherein the units of the curvature radius, the thickness and the focal length are expressed in mm, and HFOV is a half of the maximal field of view.

TABLE 21

| (8th Embodiment) f = 9.37 mm, Fno = 2.80, HFOV = 18.2 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 2.944 | ASP | 1.337 | Plastic | 1.535 | 55.8 | 5.96 |
| 2 | | 32.433 | ASP | 0.130 | | | | |
| 3 | Lens 2 | 16.685 | ASP | 0.270 | Plastic | 1.633 | 23.4 | −9.35 |
| 4 | | 4.340 | ASP | 0.248 | | | | |
| 5 | Ape. Stop | Plano | | 0.332 | | | | |
| 6 | Lens 3 | −1238.420 | ASP | 0.393 | Plastic | 1.614 | 25.6 | 93.75 |
| 7 | | −55.032 | ASP | 0.098 | | | | |
| 8 | Lens 4 | 118.867 | ASP | 1.573 | Plastic | 1.530 | 55.8 | 21.86 |
| 9 | | −12.780 | ASP | 3.276 | | | | |
| 10 | Lens 5 | 11.369 | ASP | 0.733 | Plastic | 1.514 | 56.8 | −8.44 |
| 11 | | 3.068 | ASP | 0.219 | | | | |
| 12 | Lens 6 | 47.346 | ASP | 0.716 | Plastic | 1.639 | 23.3 | 46.79 |
| 13 | | −80.572 | ASP | 0.400 | | | | |
| 14 | IR Cut Filter | Plano | | 0.300 | Glass | 1.517 | 64.2 | |
| 15 | | Plano | | 0.180 | | | | |
| 16 | Image Surface | Plano | | — | | | | |

Note:
Reference wavelength is d-line 587.6 nm

TABLE 22

| Aspheric Coefficients | | | | |
|---|---|---|---|---|
| Surface # | 1 | 2 | 4 | 5 |
| k = | −1.3436E−02 | 7.9063E+01 | 8.0548E+01 | −3.9473E+00 |
| A4 = | 1.8194E−03 | −1.9527E−03 | −2.2445E−02 | −1.1801E−02 |
| A6 = | −4.0500E−04 | 7.0872E−04 | 1.6305E−02 | 2.2058E−02 |
| A8 = | 4.2554E−04 | 6.1132E−03 | 3.8253E−03 | −2.2828E−03 |
| A10 = | −1.1124E−04 | −3.9588E−03 | −6.3475E−03 | −1.5183E−03 |
| A12 = | 1.9278E−05 | 1.0271E−03 | 1.9993E−03 | 2.5956E−04 |
| A14 = | | −1.0911E−04 | −2.3944E−04 | |
| Surface # | 6 | 7 | 8 | 9 |
| k = | −9.0000E+01 | −3.7777E+01 | −9.0000E+01 | 3.0431E+01 |
| A4 = | −5.4089E−03 | 6.7595E−04 | −2.1899E−04 | −1.0723E−03 |
| A6 = | 5.5763E−03 | 4.2118E−03 | 1.1739E−03 | 1.9454E−04 |
| A8 = | 4.0348E−03 | 2.0995E−03 | −5.6603E−05 | 3.2783E−05 |
| A10 = | −2.6090E−03 | −1.4210E−03 | 8.8356E−06 | −1.1214E−06 |
| A12 = | 6.3559E−04 | 3.4776E−04 | | |
| A14 = | −7.0371E−05 | −3.2797E−05 | | |
| Surface # | 10 | 11 | 12 | 13 |
| k = | −7.5973E+01 | −1.0837E−01 | 7.8295E+01 | 9.0000E+01 |
| A4 = | −3.2499E−02 | −4.8505E−02 | −7.2141E−03 | −1.4624E−03 |
| A6 = | −3.5629E−03 | 3.0750E−03 | 6.5107E−03 | 4.2980E−03 |
| A8 = | 2.3218E−03 | 9.7845E−04 | −1.4580E−03 | −9.2311E−04 |
| A10 = | −3.9490E−04 | −3.1113E−04 | 1.6226E−04 | 8.9584E−05 |
| A12 = | 1.6935E−05 | 3.7568E−05 | −9.9109E−06 | −4.6537E−06 |
| A14 = | 2.8334E−06 | −2.1504E−06 | 3.4043E−07 | 1.5050E−07 |
| A16 = | −2.8454E−07 | 4.4713E−08 | −6.5130E−09 | −3.6972E−09 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 9.37 | (R5 − R6)/(R5 + R6) | 0.91 |
| Fno | 2.80 | (R11 + R12)/(R11 − R12) | −0.26 |
| HFOV [deg.] | 18.2 | (|f/f3| + |f/f4|)/|f/f2| | 0.53 |
| V6 | 23.3 | Yc52/f | 0.20 |
| (V2 + V3)/V1 | 0.88 | TL/f | 1.09 |
| Nmax | 1.639 | SD/TD | 0.79 |
| T56/T45 | 0.07 | BL/TD | 0.09 |
| (T12 + T56)/(T23 + T34 + T45) | 0.09 | f/ImgH | 2.93 |
| f/R1 | 3.18 | EPD/ImgH | 1.05 |
| f/R10 | 3.05 | tan(2*HFOV) | 0.74 |
| (R1 + R12)/(R1 − R12) | −0.93 | TL/(Y62 − Y11) | 9.96 |

The foregoing description, for purpose of explanation, has been described with reference to specific embodiments. It is to be noted that TABLES 1-23 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system, comprising six lens elements, the six lens elements being, in order from an object side to an image side:
   a first lens element with positive refractive power having an object-side surface being convex thereof;
   a second lens element having negative refractive power;
   a third lens element;
   a fourth lens element;
   a fifth lens element with negative refractive power having an image-side surface being concave, at least one of an object-side surface and the image-side surface thereof being aspheric, and at least one inflection point thereof; and
   a sixth lens element;
   wherein an Abbe number of the sixth lens element is V6, a focal length of the image capturing lens system is f, a curvature radius of the object-side surface of the first lens element is R1, and the following conditions are satisfied:

$V6 < 30$; and $3.10 < f/R1 < 7.50$.

2. The image capturing lens system of claim 1, wherein the first lens element has an image-side surface being concave thereof, and the second lens element has an image-side surface being concave thereof.

3. The image capturing lens system of claim 1, further comprising an aperture stop disposed between an imaged object and the third lens element, wherein each of the first lens element, the second lens element, the third lens element, the fourth lens element, the fifth lens element and the sixth lens element is a single lens element, and a maximum refractive index among the first lens element, the second lens element, the third lens element, the fourth lens element, the fifth lens element and the sixth lens element is Nmax, and the following condition is satisfied:

$N\text{max}<1.70.$

4. The image capturing lens system of claim 1, wherein a vertical distance between a critical point on the image-side surface of the fifth lens element and an optical axis is Yc52, the focal length of the image capturing lens system is f, and the following condition is satisfied:

$0.05<Yc52/f<0.50.$

5. The image capturing lens system of claim 1, wherein the focal length of the image capturing lens system is f, a maximum image height of the image capturing lens system is ImgH, and the following condition is satisfied:

$2.35<f/\text{Img}H.$

6. The image capturing lens system of claim 1, wherein an axial distance between the first lens element and the second lens element is T12, an axial distance between the fifth lens element and the sixth lens element is T56, an axial distance between the second lens element and the third lens element is T23, an axial distance between the third lens element and the fourth lens element is T34, an axial distance between the fourth lens element and the fifth lens element is T45, and the following condition is satisfied:

$(T12+T56)/(T23+T34+T45)<0.30.$

7. The image capturing lens system of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following condition is satisfied:

$|f1|<|f3|; |f1|<|f4|; |f1|<|f6|;$ $|f2|<|f3|; |f2|<|f4|; |f2|<|f6|;$ $|f5|<|f3|; |f5|<|f4|; \text{ and } |f5|<|f6|.$ 8. The image capturing lens system of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a maximum axial distance among T12, T23, T34, T45 and T56 is T45.

9. The image capturing lens system of claim 1, wherein an entrance pupil diameter of the image capturing lens system is EPD, a maximum image height of the image capturing lens system is ImgH, and the following condition is satisfied:

$0.70<\text{EPD}/\text{Img}H<1.50.$

10. The image capturing lens system of claim 1, wherein the third lens element has at least one inflection point thereof, an axial distance between an image-side surface of the sixth lens element and an image surface is BL, an axial distance between an object-side surface of the first lens element and the image-side surface of the sixth lens element is TD, and the following conditions are satisfied:

$0<BL/TD<0.40.$

11. An image capturing lens system, comprising six lens elements, the six lens elements being, in order from an object side to an image side:
a first lens element having positive refractive power;
a second lens element;
a third lens element;
a fourth lens element;
a fifth lens element with negative refractive power having at least one of an object-side surface and an image-side surface thereof being aspheric, and having at least one inflection point thereof; and
a sixth lens element;
wherein an Abbe number of the sixth lens element is V6, an axial distance between an object-side surface of the first lens element and an image surface is TL, a focal length of the image capturing lens system is f, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, a maximum axial distance among T12, T23, T34, T45 and T56 is T45, and the following conditions are satisfied:

$V6<30; \text{ and}$ $0.85<TL/f<1.10.$

12. The image capturing lens system of claim 11, wherein a maximum refractive index among the first lens element, the second lens element, the third lens element, the fourth lens element, the fifth lens element and the sixth lens element is Nmax, and the following condition is satisfied:

$N\text{max}<1.70.$

13. The image capturing lens system of claim 11, wherein the focal length of the image capturing lens system is f, a curvature radius of the image-side surface of the fifth lens element is R10, and the following condition is satisfied:

$1.0<f/R10.$

14. The image capturing lens system of claim 11, wherein an entrance pupil diameter of the image capturing lens system is EPD, a maximum image height of the image capturing lens system is ImgH, and the following condition is satisfied:

$0.70<\text{EPD}/\text{Img}H<1.50.$

15. The image capturing lens system of claim 11, wherein the focal length of the image capturing lens system is f, an axial distance between an image-side surface of the sixth lens element and the image surface is BL, an axial distance between the object-side surface of the first lens element and the image-side surface of the sixth lens element is TD, and the following conditions are satisfied:

$4.0 \text{ [mm]}<f<12.0 \text{ [mm]}; \text{ and}$ $0<BL/TD<0.40.$

16. An image capturing lens system, comprising six lens elements, the six lens elements being, in order from an object side to an image side:
a first lens element having positive refractive power;
a second lens element having negative refractive power;
a third lens element;
a fourth lens element;

a fifth lens element with negative refractive power having at least one of an object-side surface and an image-side surface thereof being aspheric, and having at least one inflection point thereof; and a sixth lens element having positive refractive power;

wherein an axial distance between an object-side surface of the first lens element and an image surface is TL, a focal length of the image capturing lens system is f, and the following condition is satisfied:

0.85<$TL/f$<1.10.

17. The image capturing lens system of claim 16, wherein a vertical distance between a critical point on the image-side surface of the fifth lens element and an optical axis is Yc52, the focal length of the image capturing lens system is f, and the following condition is satisfied:

0.05<$Yc52/f$<0.50.

18. The image capturing lens system of claim 16, wherein an entrance pupil diameter of the image capturing lens system is EPD, a maximum image height of the image capturing lens system is ImgH, and the following condition is satisfied:

0.70<EPD/Img$H$<1.50.

19. The image capturing lens system of claim 16, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and a maximum axial distance among T12, T23, T34,T45 and T56 is T45.

20. The image capturing lens system of claim 16, wherein the axial distance between the object-side surface of the first lens element and the image surface is TL, the focal length of the image capturing lens system is f, and the following condition is satisfied:

0.85<$TL/f$≤1.0.

21. An image capturing lens system, comprising six lens elements, the six lens elements being, in order from an object side to an image side:
a first lens element with positive refractive power having an object-side surface being convex thereof;
a second lens element having negative refractive power;
a third lens element;
a fourth lens element;
a fifth lens element with negative refractive power having at least one of an object-side surface and an image-side surface thereof being aspheric, and at least one inflection point thereof; and
a sixth lens element having positive refractive power;
wherein a focal length of the image capturing lens system is f, a curvature radius of the object-side surface of the first lens element is R1, an axial distance between an image-side surface of the sixth lens element and an image surface is BL, an axial distance between the object-side surface of the first lens element and the image-side surface of the sixth lens element is TD, and the following conditions are satisfied:

3.10<$f/R1$<7.50; and

0<$BL/TD$<0.40.

22. The image capturing lens system of claim 21, wherein a maximum refractive index among the first lens element, the second lens element, the third lens element, the fourth lens element, the fifth lens element and the sixth lens element is Nmax, and the following condition is satisfied:

$N$max<1.70.

23. The image capturing lens system of claim 21, wherein an entrance pupil diameter of the image capturing lens system is EPD, a maximum image height of the image capturing lens system is ImgH, and the following condition is satisfied:

0.70<EPD/Img$H$<1.50.

24. The image capturing lens system of claim 21, wherein a vertical distance between a critical point on the image-side surface of the fifth lens element and an optical axis is Yc52, the focal length of the image capturing lens system is f, and the following condition is satisfied:

0.05<$Yc52/f$<0.50.

25. The image capturing lens system of claim 21, further comprising an aperture stop disposed between an imaged object and the object-side surface of the first lens element.

26. An image capturing lens system, comprising six lens elements, the six lens elements being, in order from an object side to an image side:
a first lens element with positive refractive power having an object-side surface being convex thereof;
a second lens element;
a third lens element;
a fourth lens element;
a fifth lens element with negative refractive power having an image-side surface being concave thereof, at least one of an object-side surface and the image-side surface thereof being aspheric, and at least one inflection point thereof; and
a sixth lens element;
wherein a focal length of the image capturing lens system is f, a curvature radius of the object-side surface of the first lens element is R1, an axial distance between the fourth lens element and the fifth lens element is T45, an axial distance between the fifth lens element and the sixth lens element is T56, and the following conditions are satisfied:

3.10<$f/R1$<7.50; and $T56/T45$<0.60.

27. The image capturing lens system of claim 26, wherein object-side surfaces and image-side surfaces of the first lens element, the second lens element, the third lens element, the fourth lens element, the fifth lens element and the sixth lens element are all aspheric, a half of the maximal field of view of the image capturing lens system is HFOV, and the following condition is satisfied:

0<tan(2*HFOV)<1.0.

28. The image capturing lens system of claim 26, wherein a vertical distance between a critical point on the image-side surface of the fifth lens element and an optical axis is Yc52, the focal length of the image capturing lens system is f, and the following condition is satisfied:

0.05<$Yc52/f$<0.50.

29. The image capturing lens system of claim 26, wherein an entrance pupil diameter of the image capturing lens system is EPD, a maximum image height of the image capturing lens system is ImgH, and the following condition is satisfied:

0.70<EPD/Img$H$<1.50.

30. The image capturing lens system of claim 26, wherein the focal length of the image capturing lens system is f, a maximum refractive index among the first lens element, the second lens element, the third lens element, the fourth lens element, the fifth lens element and the sixth lens element is Nmax, and the following condition is satisfied:

$4.0 \text{ [mm]} < f < 12.0 \text{ [mm]}$; and $N\text{max} < 1.70$.

31. The image capturing lens system of claim 26, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following condition is satisfied:

$|f1| < |f3|$; $|f1| < |f4|$; $|f1| < |f6|$;

$|f2| < |f3|$; $|f2| < |f4|$; $|f2| < |f6|$;

$|f5| < |f3|$; $|f5| < |f4|$; and $|f5| < |f6|$.

32. The image capturing lens system of claim 26, wherein the axial distance between the fifth lens element and the sixth lens element is T56, the axial distance between the fourth lens element and the fifth lens element is T45, an axial distance between the object-side surface of the first lens element and an image surface is TL, a vertical distance between a maximum effective diameter position on an image-side surface of the sixth lens element and an optical axis is Y62, a vertical distance between a maximum effective diameter position on the object-side surface of the first lens element and the optical axis is Y11, and the following conditions are satisfied:

$T56 < T45$; and $5.5 < TL/(Y62 - Y11) < 12.0$.

33. An image capturing apparatus, comprising the image capturing lens system of claim 26 and an image sensor disposed on an image surface of the image capturing lens system.

34. An electronic device, comprising the image capturing apparatus of claim 33.

\* \* \* \* \*